United States Patent
Kim et al.

(10) Patent No.: US 11,860,455 B2
(45) Date of Patent: Jan. 2, 2024

(54) MODULAR PRESCRIPTION AUGMENTED REALITY DISPLAY

(71) Applicant: NVIDIA Corporation, Santa Clara, CA (US)

(72) Inventors: Jonghyun Kim, Palo Alto, CA (US); Benjamin Boudaoud, Efland, NC (US); Michael Stengel, Cupertino, CA (US); Josef Bo Spjut, Durham, NC (US); Morgan Samuel McGuire, Waterloo (CA)

(73) Assignee: NVIDIA Corporation, Santa Clara, CA (US)

( * ) Notice: Subject to any disclaimer, the term of this patent is extended or adjusted under 35 U.S.C. 154(b) by 437 days.

(21) Appl. No.: 16/711,228

(22) Filed: Dec. 11, 2019

(65) Prior Publication Data

US 2021/0181533 A1  Jun. 17, 2021

(51) Int. Cl.
G02C 9/00 (2006.01)
G02B 27/01 (2006.01)

(52) U.S. Cl.
CPC .......... G02C 9/00 (2013.01); G02B 27/0176 (2013.01); G02B 2027/0178 (2013.01); G02C 2200/02 (2013.01)

(58) Field of Classification Search
CPC ........ G02B 2027/0178; G02C 2200/02; G02C 9/00; G02C 9/0176; G02C 9/017; G02C 9/0101; G02C 9/01
USPC ........................................................ 351/158
See application file for complete search history.

(56) References Cited

U.S. PATENT DOCUMENTS

| | | | | |
|---|---|---|---|---|
| 6,911,969 B1 * | 6/2005 | Nelson | ..................... | G06F 3/011 345/163 |
| 10,901,225 B1 * | 1/2021 | De Nardi | ........... | G02B 27/0093 |
| 11,086,126 B1 * | 8/2021 | Gollier | .................. | G06F 1/1654 |
| 2009/0005961 A1 * | 1/2009 | Grabowski | .......... | G01C 21/365 701/532 |
| 2016/0003636 A1 * | 1/2016 | Ng-Thow-Hing | ... | G06V 20/588 701/418 |
| 2016/0357016 A1 * | 12/2016 | Cakmakci | .......... | G02B 27/0172 |
| 2017/0010465 A1 * | 1/2017 | Martinez | ............... | G02B 27/017 |

(Continued)

OTHER PUBLICATIONS

Aksit et al., "Near-Eye Varifocal Augmented Reality Display using See-Through Screens," ACM Transactions on Graph, 2017, 13 pages.

(Continued)

*Primary Examiner* — William R Alexander
(74) *Attorney, Agent, or Firm* — Davis Wright Tremaine LLP

(57) ABSTRACT

In an embodiment, a modular augmented reality display is provided that incorporates prescription eyewear that can be used separately by the wearer. In an embodiment, an image is generated from a removable display attached to the eyewear and directed into the edge of a prescription lens, which acts as a waveguide. The image is internally reflected within the prescription lens, and is directed to the wearer by an image combiner embedded within the prescription lens. In an embodiment, the augmented reality display includes a wearable belt pouch that includes a battery and support electronics connected to the eyewear so that the weight on the eyewear is reduced.

17 Claims, 26 Drawing Sheets

(56) References Cited

U.S. PATENT DOCUMENTS

| | | | |
|---|---|---|---|
| 2018/0024367 A1* | 1/2018 | Jannard | G02B 27/0176 |
| | | | 348/789 |
| 2018/0249086 A1* | 8/2018 | Ozawa | G06F 3/147 |
| 2018/0348529 A1* | 12/2018 | Blum | G02B 27/0172 |
| 2019/0129182 A1* | 5/2019 | Hu | G02B 6/0008 |
| 2019/0287495 A1* | 9/2019 | Mathur | G09G 5/391 |

OTHER PUBLICATIONS

Anstis, "A Chart Demonstrating Variations in Acuity with Retinal Position," Vision Research, 14, 1974, 4 pages.

Atchison, "Optical Models for Human Myopic Eyes," Vision Research, 2016, 15 pages.

Bauer et al., "Starting Geometry Creation and Design Method for Freeform Optics," Nature Communications 9:1756, 2018, 11 pages.

Burns et al., "Slanted-Edge MTF for Digital Camera and Scanner Analysis," Society for Imaging Science & Technology, 2000, 4 pages.

Cheng et al., "Design of a Wide-Angle, Lightweight Head-Mounted Display using Free-Form Optics Tiling," Optics letters 36(11): Jun. 1, 2011, 3 pages.

Cheng et al., "Design of an Optical See-Through Head-Mounted Display with a Low F-Number and Large Field of View using a Freeform Prism," Applied Optics 48, 2009, pp. 2655-2668.

Digilens, "ArHUD," retrieved on May 17, 2021, from https://web.archive.org/web/20181230112154/https://www.digilens.com/products/arhud/, Dec. 30, 2018, 4 pages.

Dodgson, "Variation and Extrema of Human Interpupillary Distance," Stereoscopic Displays and Virtual Reality Systems XI, vol. 5291, Jan. 19-22, 2004, 11 pages.

Google, "Google Glass," https://www.google.com/glass/start/, (undated), 8 pages.

Guttag, North's Focals Laser Beam Scanning AR Glasses—"Color Intel Vaunt," Mar. 15, 2019, 7 pages.

Hashemi et al., "Global and Regional Estimates of Prevalence of Refractive Errors: Systematic Review and Meta-Analysis," Journal of Current Ophthalmology 30, 2018, 20 pages.

Hoffmann et al., "Analysis of Biometry and Prevalence Data for Corneal Astigmatism in 23 239 Eyes," 2010, 7 pages.

Holden et al., "Global Prevalence of Myopia and High Myopia and Temporal Trends from 2000 through 2050," Ophthalmology 123, 2016, 7 pages.

Hua et al., "A 3D Integral Imaging Optical See-through Head-Mounted Display," College of Optical Science, 2014, 8 pages.

IEEE, "IEEE Standard 754-2008 (Revision of IEEE Standard 754-1985): IEEE Standard for Floating-Point Arithmetic," Aug. 29, 2008, 70 pages.

Jang et al., "Holographic Near-Eye Display with Expanded Eyebox," SIGGRAPH Asia Technical Papers, ACM, 2018, 14 pages.

Jang et al.,"Retinal 3D: Augmented Reality Near-Eye Display via Pupil-Tracked Light Field Projection on Retina," ACM Transactions on Graph, 2017, 13 pages.

Kim et al., "Foveated AR: Dynamically-Foveated Augmented Reality Display," ACM Transactions on Graph, 38, 99, 2019, 15 pages.

Kim et al., "Prescription-Embedded Augmented Reality Display," U.S. Appl. No. 62/833,594, filed Apr. 12, 2019.

Lee et al., "Foveated Retinal Optimization for See-Through Near-Eye Multi-Layer Displays," IEEE Access 6, Oct. 26, 2017, pp. 2170-2180.

Lumus, "OE Vision," retrieved on May 17, 2021, from https://web.archive.org/web/20180517195921/https://lumusvision.com/products/OE-vision/, May 17, 2018, 2 pages.

Maimone et al., "Holographic Near-Eye Displays for Virtual and Augmented Reality," ACM Transactions on Graph, 36, 85, 2017, 16 pages.

Maimone et al., "Pinlight Displays: Wide Field of View Augmented Reality Eyeglasses using Defocused Point Light Sources," ACM SIGGRAPH Emerging Technologies, 2014, 11 pages.

McGuire et al., "The G3D Innovation Engine," https://casual-effects.com/g3d/www/index.html, 2017, 7 pages.

Microsoft, "3D Scanning with Windows 10," https://developer.microsoft.com/en-us/windows/hardware/3d-print/scanning-with-kinect.

Microsoft, "HoloLens2," https://docs.microsoft.com/en-us/hololens/hololens2-hardware, 2020, 11 pages.

Nicholson, "How to Design Progressive Lenses," 2006, 3 pages.

North Incorporation, "Focals by North," https://www.bynorth.com/, 2012, 3 pages.

Pan et al., "The Age-Specific Prevalence of Myopia in Asia: A Meta-analysis," Optometry and Vision Science, 92(3): 2015, pp. 258-266.

Pastuszka, "Design a Head-Mounted Display(HMD) for Augmented Reality System in Zemax Opticstudio," 2015, 8 pages.

Patney et al., "Towards Foveated Rendering for Gaze-Tracked Virtual Reality," ACM Transactions on Graph 2016, 12 pages.

Rubino, "Microsoft Hololens—Here are the full processor, storage and RAM specs," May 2, 2016, 4 pages.

Sun et al., "Ophthalmic Lens Design with the Optimization of the Aspherical Coeffiecients," 2000, 11 pages.

Tong et al., "Scanning 3D Full Human Bodies Using Kinects," IEEE Transactions on Visualization Computer Graphics, 18, 2012, 8 pages.

Wang et al. "Augmented Reality with Image Registration, Vision Correction and Sunlight Readability via Liquid Crystal Devices," Scientific Reports 7, Mar. 27, 2017, 12 pages.

Watkins, "Ophthalmic Lens Design," 2015, 5 pages.

Wilson et al., "Design and Demonstration of a Vari-Focal Optical See-through Head-Mounted Display using Freeform Alvarez Lenses," Optics Express 27(11): May 27, 2019, 11 pages.

Zhou et al., "See-Through Near-Eye Displays Enabling Vision Correction," Optics Express, 25(3): 2017, 13 pages.

Wu et al., "Prescription AR: A Fully-Customized Prescription-Embedded Augmented Reality Display," NVIDIA, 2019, 17 pages.

* cited by examiner

MODULAR PRESCRIPTION AUGMENTED REALITY DISPLAY

BACKGROUND

Augmented reality ("AR") is an emerging field in which graphical elements are added to an image of the real world. Augmented reality displays can be constructed in a number of ways. For example, some handheld devices implement a type of augmented reality by capturing an image of the real world with a camera, adding computer-generated images to the captured image, and then displaying the augmented image on the mobile display. Other devices attempt to add a generated image to eyeglasses similar to a heads-up display. Creating effective AR displays is particularly difficult when the user of the display uses a form of corrective vision. Allowing for use with existing corrective eyewear often results in a bulky and cumbersome AR display, and using the AR display without corrective eyewear results in a blurry or unclear display being presented to the wearer. Since a significant portion of the population relies on prescription eyewear to see properly, producing an effective AR display that allows for vision correction is an important problem.

BRIEF DESCRIPTION OF THE DRAWINGS

Various techniques will be described with reference to the drawings, in which.

DETAILED DESCRIPTION

Figure 1:
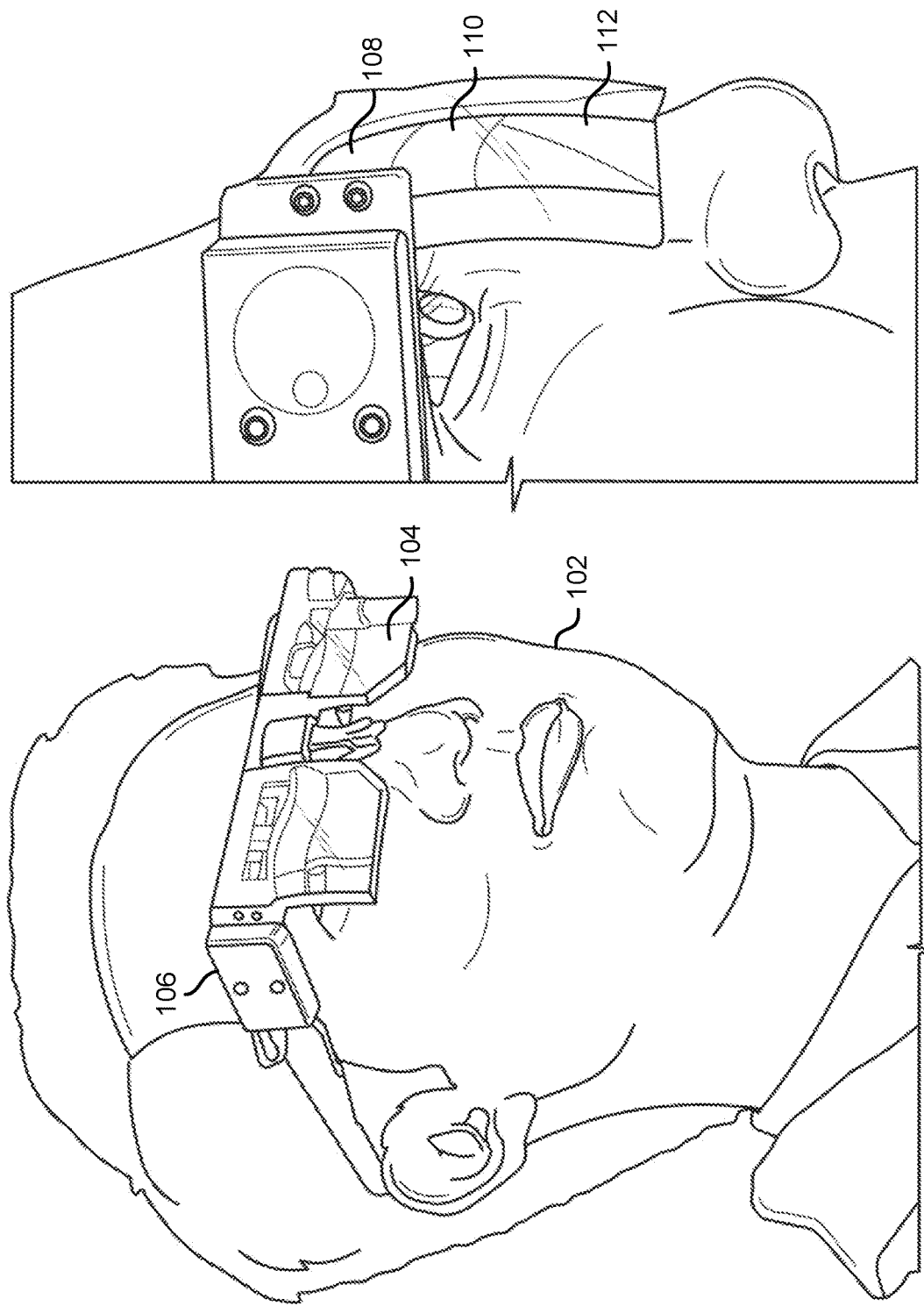
FIG. 1 illustrates an example of a prescription augmented reality display worn by a user, in accordance with an embodiment.

The present document describes a modular augmented reality ("AR") display that includes a prescription lens for vision correction. In at least one embodiment, the prescription lens is integrated into a frame, and the lens-frame assembly can be detached from AR components of the AR display so that the lens-frame assembly can be used as a set of conventional prescription eyewear without AR functionality. Removing the AR components lightens the eyewear sufficiently so that the eyewear is more comfortable in extended use. In various examples, the electronic components are removably attached using magnets or clips to the lens-frame assembly. In at least one embodiment, the removable AR components include one or more organic light emitting diode ("OLED") displays and one or more lenses that shape and direct images into the edge of the prescription lens, thereby providing AR image content to the wearer.

In some examples, the AR components include a support pack with a battery, computer system, and wireless interface. In at least one embodiment, a server computer system sends display information to the computer system on the support pack via the wireless interface, and the computer system sends the information to the AR components mounted on the eyewear. In various embodiments, the support pack can be attached to a belt, pant waistline, or article of clothing worn by the user. In some examples, the support pack may be placed in a user's pocket. In at least one embodiment, the support pack is connected to AR components on the lens-frame assembly via a wired connection that carries power and data signals. By moving the battery and computer components to the support pack, the weight of the AR display on the wearer's head is reduced, increasing comfort in long-term use.

In at least one embodiment, the AR display presents virtual images in real-world scenes while preserving the viewer's natural vision. In at least one embodiment, an optical structure is provided that has a slim form factor, a high-resolution, large field-of-view (FOV), large eye box, and variable focus. In an embodiment, the diverse spectrum of human head shape and eye structure aggravates this challenge further. Various users have different interpupillary distance (IPD, 54-68 mm) and nose shapes, which raise the bar on eye box and eye relief coverage beyond the requirement for a single user. More than 40% of the population uses special aids for vision correction caused by myopia, hyperopia, astigmatism, and presbyopia. Unlike other designs that may be used with prescription eyeglasses, at least one embodiment described herein provides an AR display that includes corrective lenses adapted to the viewer's prescription. By integrating the viewer's prescription into the AR display, overall weight and size of the system can be improved significantly.

In an embodiment, a prescription-embedded AR display is provided. In an embodiment, an optical design for the AR display utilizes a prescription lens as a waveguide for the AR display. In an embodiment, a free-form image combiner is embedded in the prescription lens, allowing the one-piece lens to both deliver virtual scenes and also correct the vision of a real-world scene simultaneously. In at least one embodiment, the image combiner is a half-silvered mirror or semi-reflective film. In an example of an embodiment, a shape for the prescription lens is provided for a modified myopia eye model. In an embodiment, a free-form image combiner, in-coupling prism, and beam-shaping lens are optimized based on each individual prescription lens. In at least one embodiment, a customized ergonomic eye-glasses design is achieved by using 3D facial scanning. In at least one embodiment, a Prescription AR prototype with a 5-mm thick lens provides 1 diopter (1D) vision correction, 23 cycles per degree (cpd) angular resolution at center, 4 mm eye box, and varifocal (0D-2D) capability. In at least one embodiment, the prototype is lightweight (169 g for dynamic and 79 g for static prototype), has 70% transparency, protects a user's privacy, and enables eye-contact interaction with surroundings.

FIG. 1 illustrates an example of a prescription augmented reality display worn by a user, in accordance with an embodiment. In at least one embodiment, the wearer 102 equips the augmented reality display in a manner similar to conventional eyeglasses. In at least one embodiment, at least one augmented reality lens 104 is held by a frame 106 which is worn by the wearer 102. In at least one embodiment, two augmented reality lenses are provided in the augmented reality display to provide binocular vision of the augmented images.

In at least one embodiment, the augmented reality display positions the lenses close to the wearer's face so that the eye relief and eye box of the display can be minimized. In at least one embodiment, the augmented reality lens 104 provides three regions through which the wearer can look. In at least one embodiment, a first region 108 at the top of the augmented reality lens and a third region 112 at the bottom of the augmented reality lens provide an optical correction in accordance with a corrective vision prescription of the wearer. In at least one embodiment, a second region 110 in the middle of the augmented reality lens includes an image combiner constructed from a half mirrored surface embedded within the lens. In at least one embodiment, an image injected down through the edge of the lens from a display within the frame is reflected internally within the lens until it comes in contact with the image combiner. In at least one embodiment, the image is redirected towards the eye of the wearer along with an image of the real world that is transmitted through the lens and the image combiner. In at least one embodiment, the first region 108 and the third region 112 are coated with a neutral density filter so that the image transmission through the lens is roughly even from the top to the bottom of the lens. In at least one embodiment, the view through the second region 110 includes both transmitted images from the real-world and images generated from the electronic display within the frame of the augmented reality display.

In at least one embodiment, the profile of the augmented reality lens 104 is adapted in accordance with a vision prescription of the wearer. In at least one embodiment, the image combiner is formed within the lens and has a surface profile that similarly presents an in-focus image in accordance with the vision correction needed by the wearer. In at least one embodiment, the position of the virtual image originating from within the display on the augmented reality display can be altered by moving the position of the display in relation to the frame either manually or by electronic servo.

Figure 2:
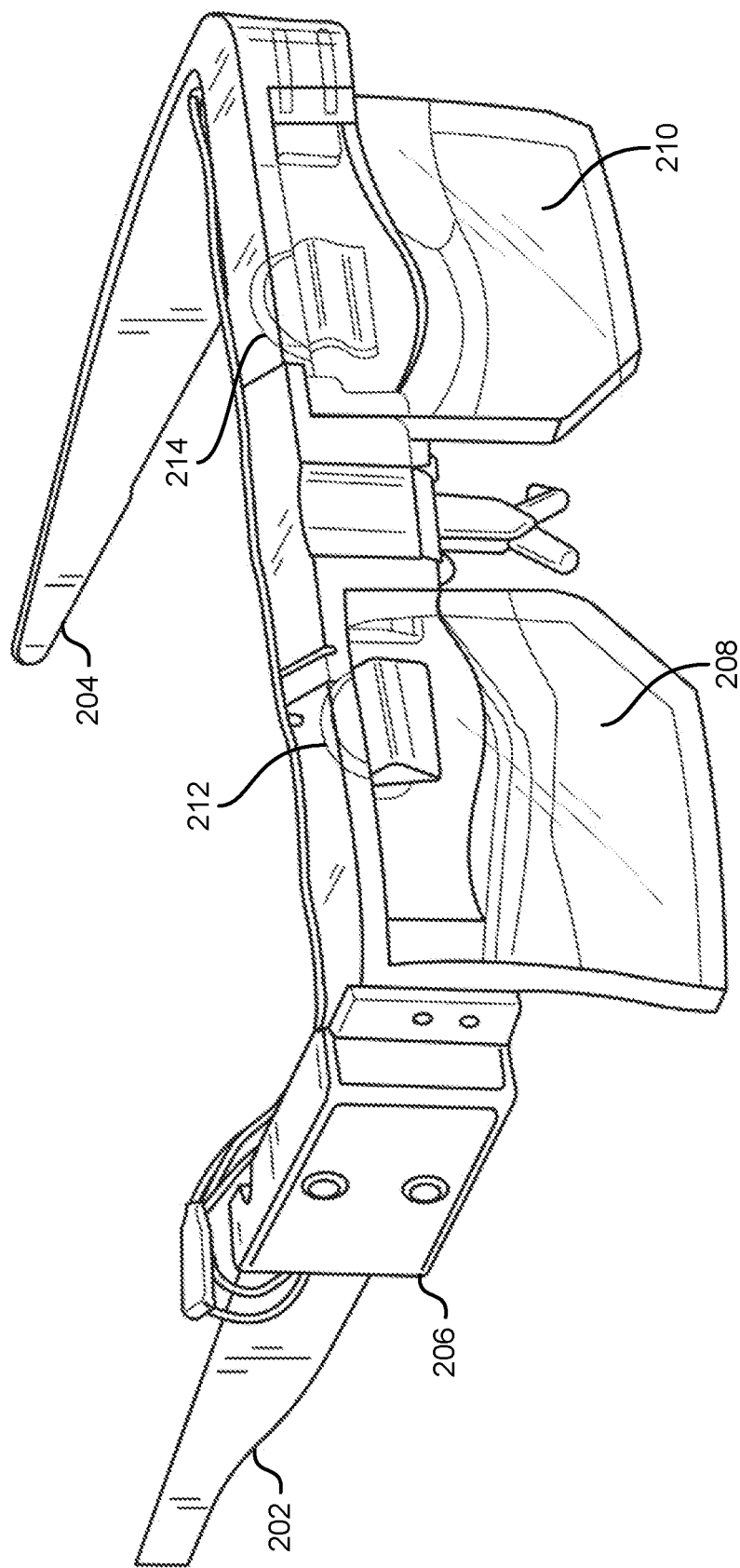
FIG. 2 illustrates an example of an augmented reality display integrated into prescription eyeglasses, in accordance with an embodiment.

FIG. 2 illustrates an example of an augmented reality display integrated into prescription eyeglasses, in accordance with an embodiment. In at least one embodiment, the augmented reality display is produced in an eyeglass form factor having a frame with two arms 202 and 204. In at least one embodiment, a power and control unit 206 drives a pair of electronic displays mounted in the top of the frame. In at least one embodiment, the power and control unit 206 includes one or more buttons to allow control of the display by the wearer. In at least one embodiment, the power and control unit 206 includes a battery, processor, and graphical interface. In at least one embodiment, the processor and graphical interface may include a CPU or GPU as described in FIGS. 16 through 20. In at least one embodiment, the augmented reality display includes two lenses 208 and 210 that include an image combiner within each lens. In at least one embodiment, the image combiner combines the image transmitted through the lens with the image created by the electronic display. In at least one embodiment, the augmented reality display includes a beam-shaping lens and prism, 212 and 214, in each lens that directs the image produced by the electronic display downward into the lens such that the image is internally reflected and directed to the image combiner of each lens.

Figure 3:
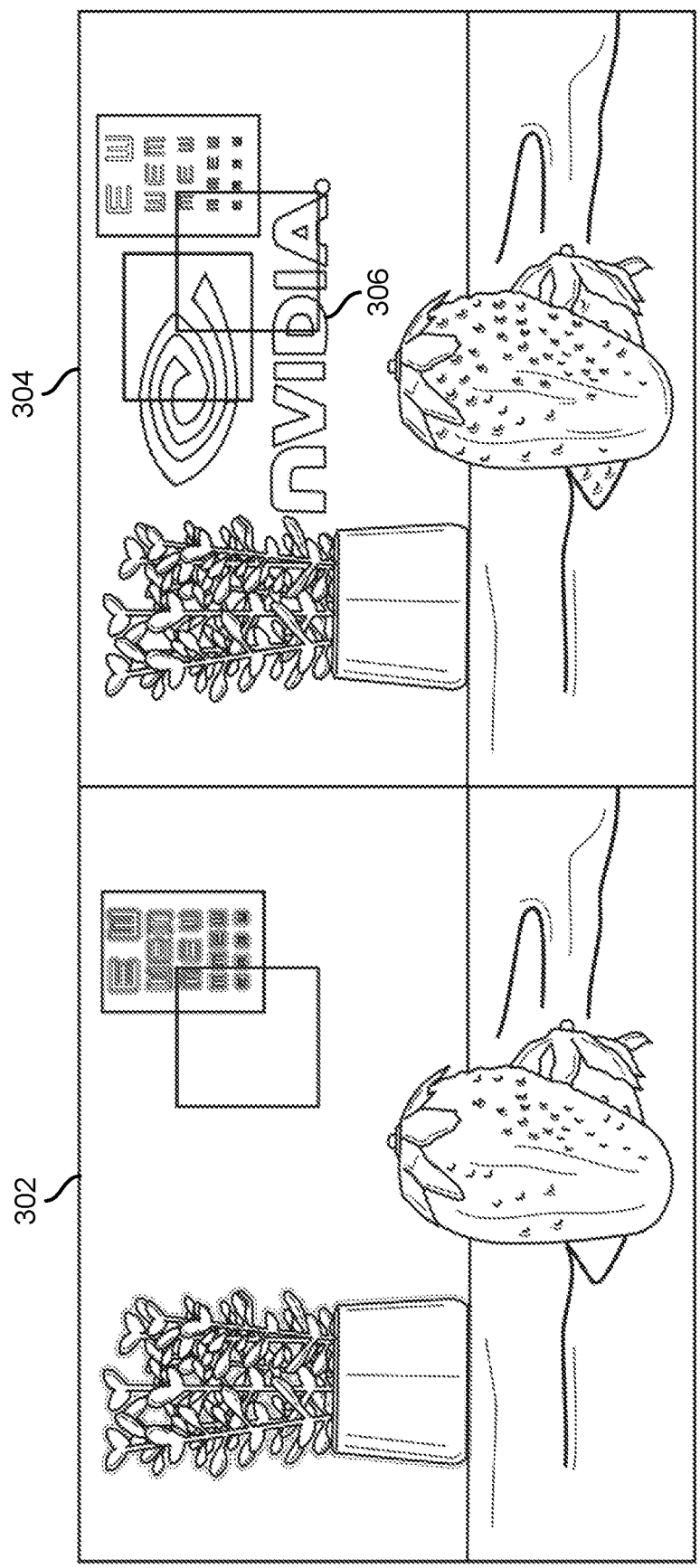
FIG. 3 illustrates an example of an image produced by an augmented reality display, in accordance with an embodiment.

FIG. 3 illustrates an example of an image produced by an augmented reality display, in accordance with an embodiment. In at least one embodiment, a first image 302 illustrates an image transmitted through the lens from the real-world to the wearer. In at least one embodiment, a second image 304 illustrates an augmented image seen by the wearer of the augmented reality display. In the example illustrated in FIG. 3, the second image includes a logo and lettering added by the image combiner and produced by an electronic display 306 on the augmented reality display.

Figure 4:
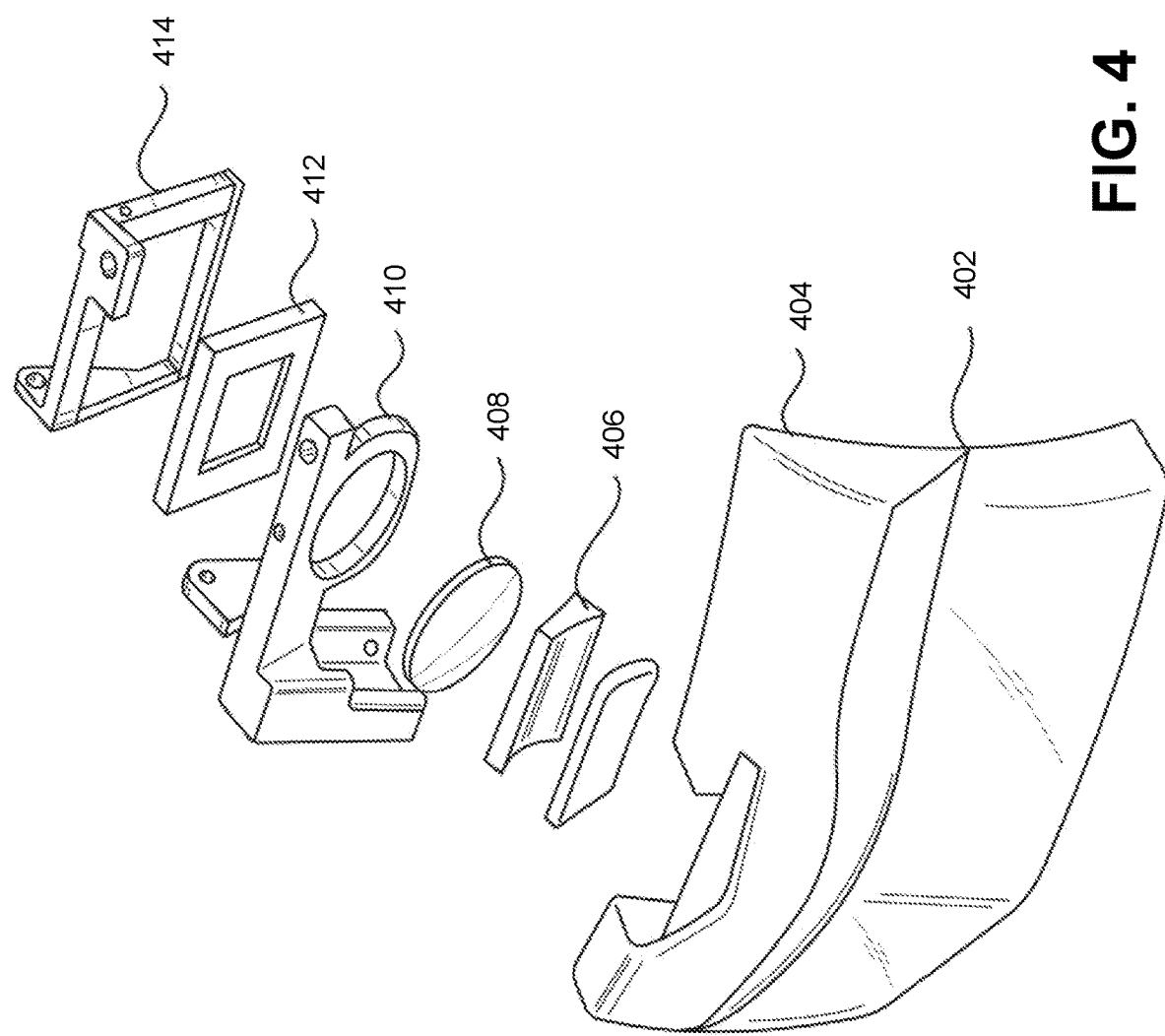
FIG. 4 illustrates an example of a lens assembly of an augmented reality display, in accordance with an embodiment.

FIG. 4 illustrates an example of a lens assembly of an augmented reality display, in accordance with an embodiment. In at least one embodiment, the augmented reality display includes a free-form image combiner 402 embedded within a prescription lens 404. In at least one embodiment, the prescription lens 404 is fabricated in accordance with a vision correction prescription. In at least one embodiment, the free-form image combiner 402 is made by coating the interface between two parts of the prescription lens 404 with a half-silver material and joining the parts with optical glue.

In at least one embodiment, the lens assembly includes an in-coupling prism 406 and a beam-shaping lens 408 that, in combination, direct an image produced by a micro LED 412 into the edge of the prescription lens 404. In at least one embodiment, the beam-shaping lens 408 is retained in position by a lens holder 410 secured to a frame of the augmented reality display. In at least one embodiment, the micro-LED is held in pace with a panel holder 414. In at least one embodiment, the panel holder 414 includes a manual or electronic actuator that allows the micro-LED to be moved along the optical axis of the beam-shaping lens. In at least one embodiment, movement of the micro-LED panel is accomplished with a thumbscrew attached to the threaded rod. In at least one embodiment, movement of the micro LED panel is accomplished using an ultra-thin auto focus actuator module ("UTAF").

Figure 5:
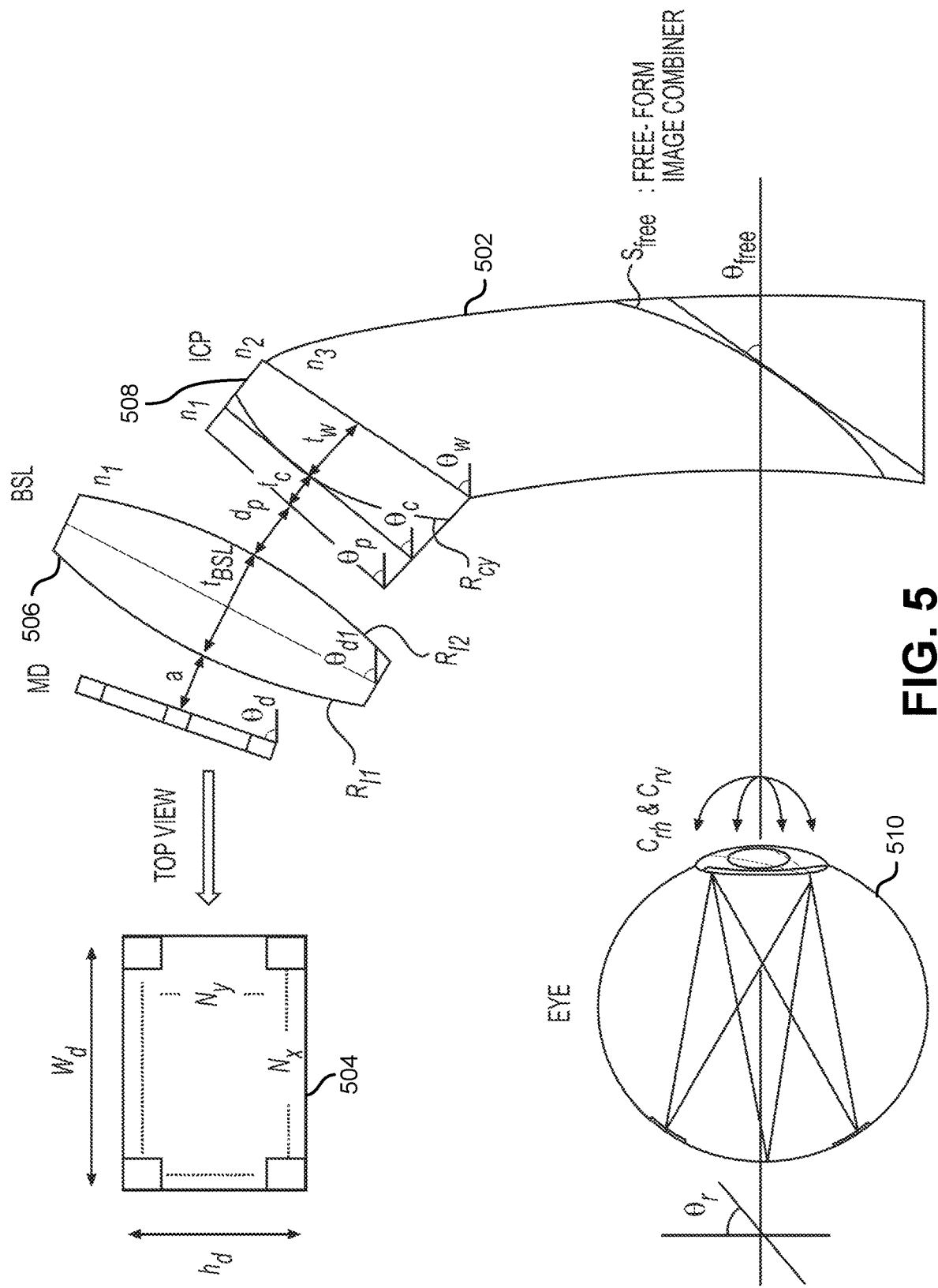
FIG. 5 illustrates an example of a display unit and lens geometry that combines the output of the display unit with a prescription lens to form an augmented reality display, in accordance with an embodiment.

FIG. 5 illustrates an example of a display unit and lens geometry that combines the output of the display unit with a prescription lens to form an augmented reality display, in accordance with an embodiment. FIG. 5 illustrates a side view and the beam path of an embodiment. In at least one embodiment, a prescription lens 502 works both for vision-correction and as a wave-guide for an AR image produced by a micro display 504. In at least one embodiment, light rays from the micro display 504 are refracted by a beam-shaping lens 506 and enter the prescription lens through an in-coupling prism 508 to create a magnified virtual image located a distance $d_i$ from an eye 510. In at least one embodiment, the virtual image depth can be dynamically changed from 0D to 2D by moving the micro display 504 axially ($\Delta a$).

In at least one embodiment, a prescription AR display optically corrects a user's vision with a prescription lens, and utilizes the prescription lens as a waveguide in an AR display system. As shown in FIG. 5, the top surface of the prescription lens of thickness $t_l$ is used as an entrance of the waveguide. In at least one embodiment, the light rays from a micro display of size $w_d \times h_d$ and resolution $N_x \times N_y$ located in front of the user's forehead with an angle $\theta_d$ are refracted by a bi-convex ($R_{l1}$, $R_{l2}$) beam-shaping lens (refractive index: $n_1$, thickness: $t_{BSL}$) located at a distance a from the micro display with the tilted angle $\theta_l$ and entered to the waveguide through an in-coupling prism (refractive index: $n_1$) located at $d_p$ from the beam-shaping lens with the tilted angle $\theta_p$. In at least one embodiment, the in-coupling prism is composed by a set of a plano-concave and a convex-plano cylindrical lens. In at least one embodiment, the rays are refracted by a cylindrical lens ($R_{cy}$, refractive index: $n_2$) located at $t_c$ from the prism surface with the tilted angle $\theta_c$ and travel in the waveguide (refractive index: $n_3$, tilted angle: $\theta_w$) located at $t_w$ from the cylindrical surface as shown in FIG. 4. In an embodiment, the light rays are internally reflected twice by the frontal surface ($S_f$) and the rear surface ($S_r$) of the prescription lens, reflected by a free-form half-mirror coated surface ($S_{free}$, tilted angle: $\theta_f$), and arrive at the pupil of the eye. In at least one embodiment, the in-coupling prism, cylindrical lens, upper part of the prescription lens, and lower part of the prescription lens are bonded by an optical adhesive, such that the prescription lens is comprised of two lens pieces: the main lens and the beam-shaping lens. In at least one embodiment, the enlarged virtual image of size $w_i \times h_i$ is located at distance $d_i$ from the eye in the vision-corrected real scene. In at least one embodiment, the virtual image depth can be dynamically adjusted ($\Delta d_i$) by moving the micro display back and forth ($\Delta a$).

Figure 10:
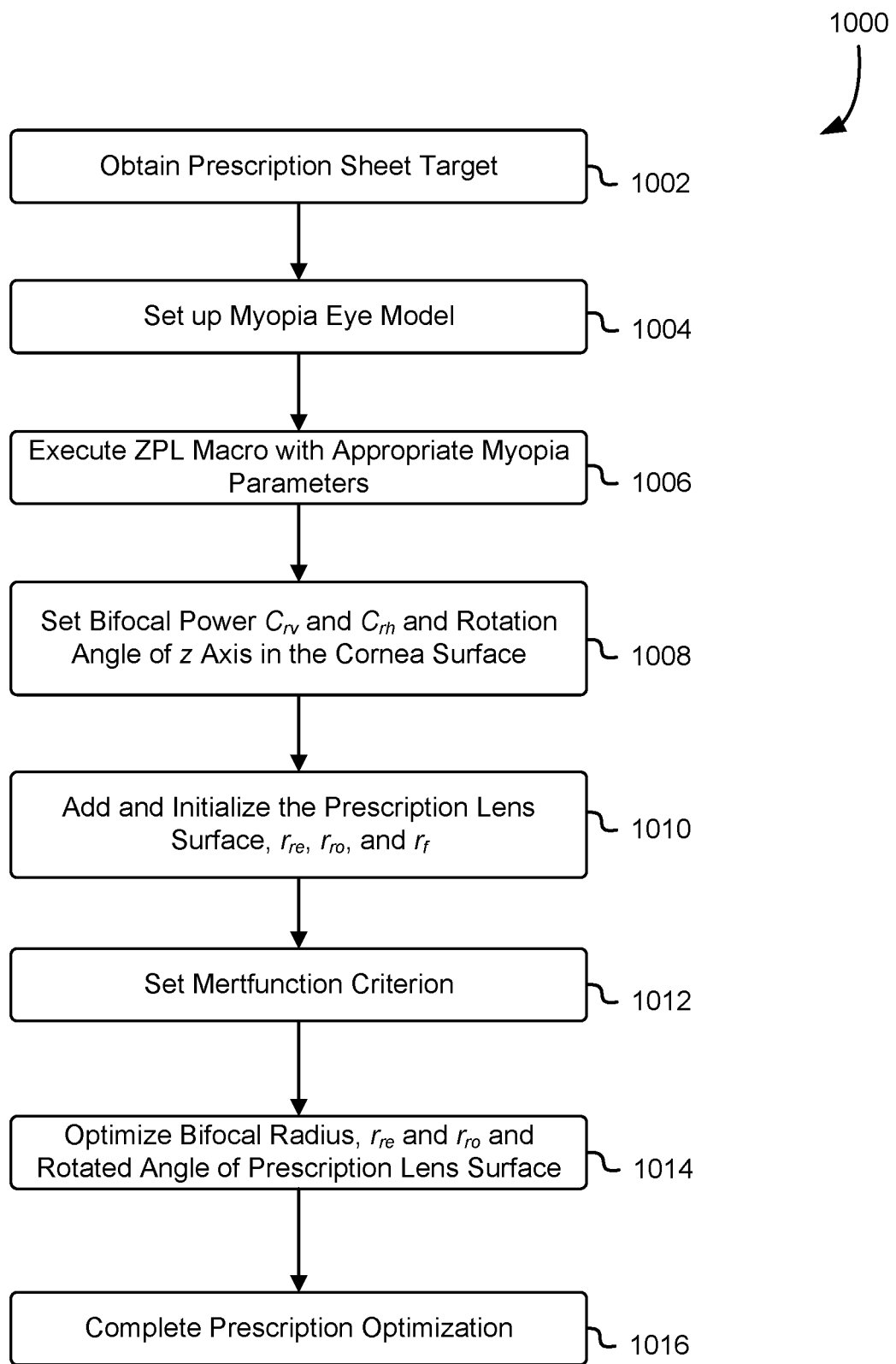
FIG. 10 illustrates an example of a process that, as a result of being performed, optimizes a prescription lens of a prescription AR display, in accordance with an embodiment.
Figure 11:
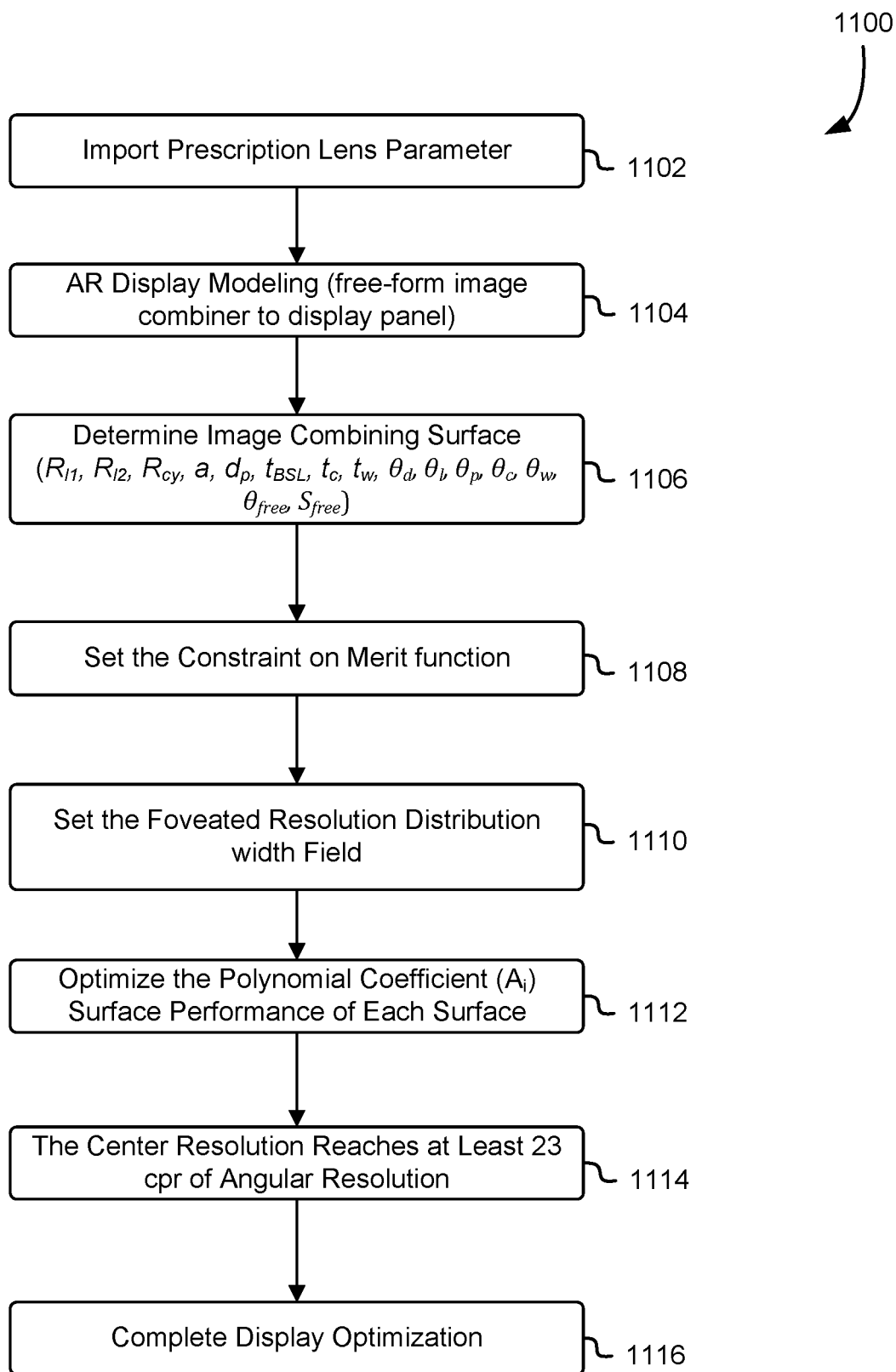
FIG. 11 illustrates an example of a process that, as a result of being performed, optimizes an AR display of a prescription AR display, in accordance with an embodiment.

In at least one embodiment, the optical design process includes two phases: the prescription lens design ($S_f$, $S_r$) and the AR display path design using an optics simulation tool such as Zemax OpticStudio. The overall optical path is difficult to investigate using an analytic form because of the free-form surface and the multiple off-axis components utilized in the display. Nevertheless, in at least one embodiment, a universal design and optimization method is demonstrated which is valid for many prescriptions including myopia, astigmatism, hyperopia, and presbyopia. FIGS. 10-11 show an example of the two-phase optimization process in Prescription AR, which is started from the user's eyeglasses prescription including spherical correction (SPH), cylinder correction (CYL), axis of astigmatism (AXIS), and add power (ADD).

Figure 6:
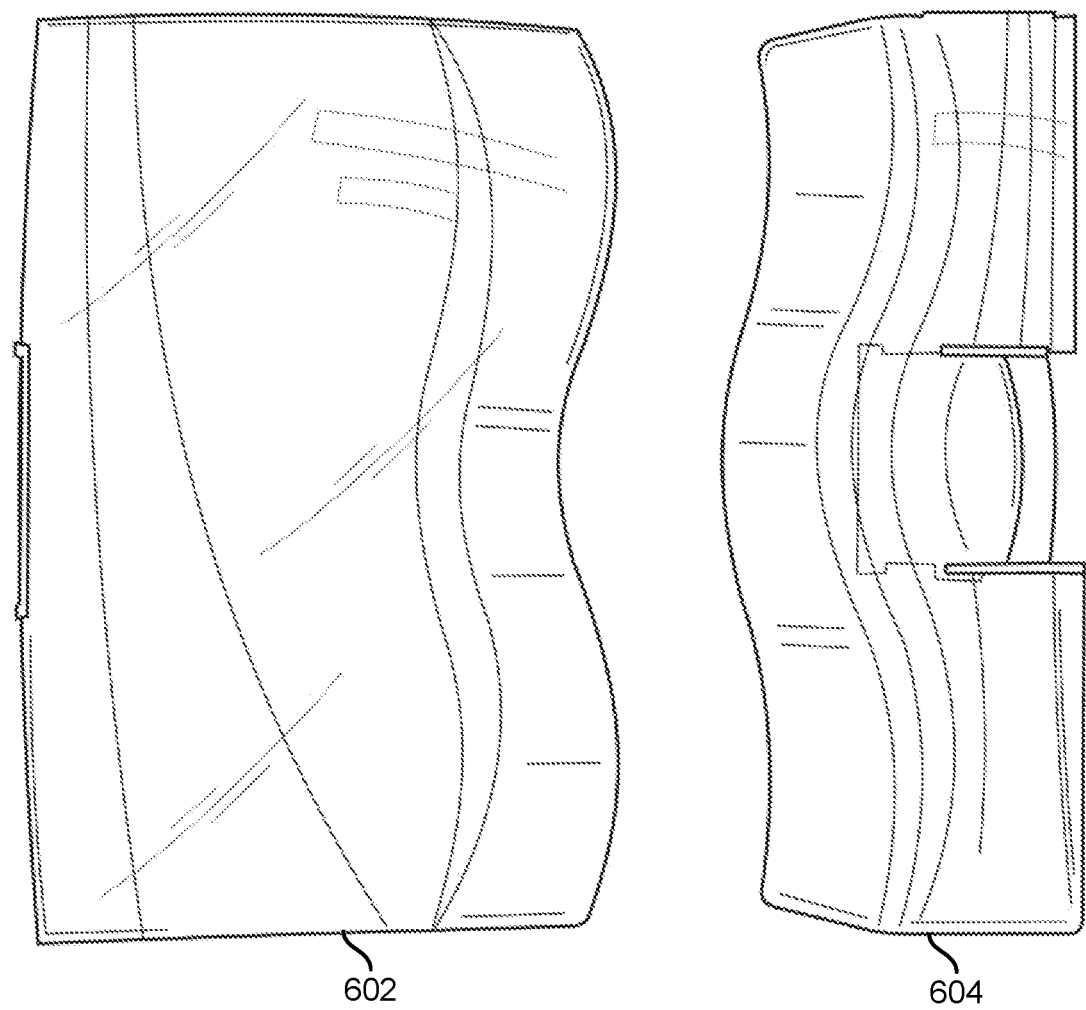
FIG. 6 illustrates an example of a prescription lens assembly with an image combiner, in accordance with an embodiment.

FIG. 6 illustrates an example of a prescription lens assembly with an image combiner, in accordance with an embodiment. In at least one embodiment, the prescription lens is constructed using two injection molded pieces. In at least one embodiment, a first lens part 602 and a second lens part 604 are joined with optical glue at an interface. In at least one embodiment, a half-silvered image combiner is placed within the interface and is embedded within the assembled lens.

Figure 7:
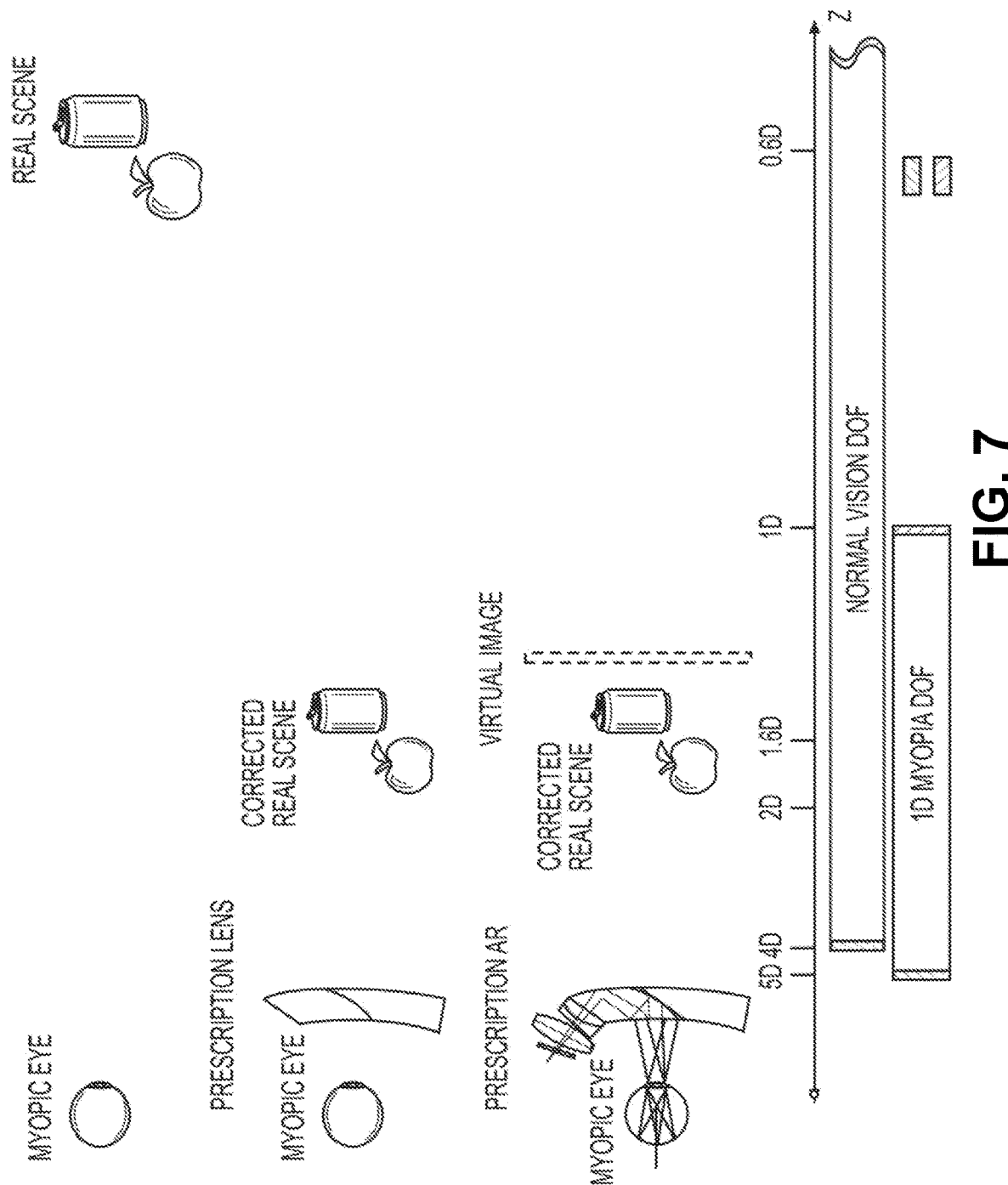
FIG. 7 illustrates an example of prescription augmented reality for a myopic eye, in accordance with an embodiment.

FIG. 7 illustrates an example of prescription augmented reality for a myopic eye, in accordance with an embodiment. In at least one embodiment, the first phase is the optimization of the prescription lens, including the frontal ($S_f$) and rear ($S_r$) surface profile. FIG. 7 shows, in one embodiment, how to design the prescription lens for a myopic eye. As shown in FIG. 7, the normal vision whose amplitude of accommodation is 4D has a far point at 0D and near point at 4D. The 1D myopic eye with the same amplitude of accommodation has a far point at 1D and near point at 5D. So the observer cannot perceive full-resolution images of the objects located at 0.6D. In at least one embodiment, the prescription lens shifts the object at infinity to the myopic eye's far point (1D) so that the objects are imaged at 1.6D plane, inside the depth of field (DOF). In at least one embodiment, the prescription lens compensates for astigmatism by adding inverse cylinder power to the given axis.

In at least one embodiment, instead of using direct calculation of surface profiles from the SPH, CYL, AXIS, and ADD values, both surfaces are determined using a human eye model. In at least one embodiment, this determination method reduces the aberration at the given thickness $t_l$, refractive index $n_3$, and given eye relief $d_e$. Atchison built a human myopic eye model based on the measured data from 121 subjects, and it is known in the art that the total astigmatism is the sum of the corneal and internal astigmatism. However, there isn't a general human eye model covering both myopia and astigmatism. The techniques presented in the present document assume corneal astigmatism only and modified the corneal surface property of the Atchison's model. This assumption is valid in this case because the prescription lens is affected by the sum of the astigmatism, not the source. The cornea surface profile $C_{rv}$ and $C_{rh}$ are calculated from the CYL and AXIS value, and the modified eye model is achieved with SPH value as shown in Table 1 below.

In at least one embodiment, Table 1 below shows the modified myopia eye model based on Atchison's model where the $r_x$ and $r_y$ are the radius values of a bifocal system in horizontal and vertical respectively, $k_x$ and $k_y$ are the conic constant of bifocal system in horizontal and vertical respectively, $N_d$ is the reflective index of material, and $V_d$ is the Abbe number of the material. In at least one embodiment, the radius of cornea surface, $r^*_x$, is calculated by adding the CYL power into another direction as $D_x=D_y+CYL$, where the $D_y=(Nd-1)/r_y$. The compete equation of $r_x$ is expressed below as Eq(1).

| Surface | Type | Radius | Conic | Thickness | Material | Rotation |
|---|---|---|---|---|---|---|
| Cornea | biconic | $r^*_x = (Nd - 1)/D_x$ <br> $r_y = 7.77 + 0.022SR$ | $k_x = -0.15$ <br> $k_y = -0.15$ | 0.55 | Nd = 1.376 <br> Vd = 55.468 | 90-AXIS (°) |
| Aqueous | standard | 6.40 | -0.275 | 3.05 | Nd = 1.3337 <br> Vd = 50.522 | — |
| Stop | standard | infinite | — | 0.1 | Nd = 1.337 <br> Vd = 50.522 | — |
| Anterior lens | gradient lens | 11.48 | -5.00 | 1.44 | $1.371 + 0.0652778Z$ <br> $-0.0226659Z^2$ <br> $-0.0020399(X^2 + Y^2)$ | — |
| Posterior lens | gradient lens | infinite | — | 2.16 | $1.418 - 0.0100737Z^2$ <br> $-0.0020399(X^2 + Y^2)$ | — |
| Vitrous | standard | -5.90 | -2.00 | 16.28 - 0.299SR | Nd = 1.336 <br> Vd = 51.293 | — |
| Retina | biconic | $r_x = -12.91 - 0.094SR$ <br> $r_y = -12.72 + 0.004SR$ | $k_x = 0.7 + 0.026SR$ <br> $k_y = 0.225 + 0.017SR$ | — | — | — |

In at least one embodiment, based at least in part on this modified myopia eye model, $S_f$ and $S_r$ are determined. In at least one embodiment, $S_f$ is set as a spherical surface of radius $r_f$ while $S_r$ is set as a bifocal surface of radii $r_{ro}$, $r_{re}$ and rotation angle $\theta_r$, to correct the myopia and the astigmatism. In an embodiment, the values were optimized iteratively with the merit function for the range of 12 to 20 mm eye relief and 26×18 degrees of the field.

Figure 8:
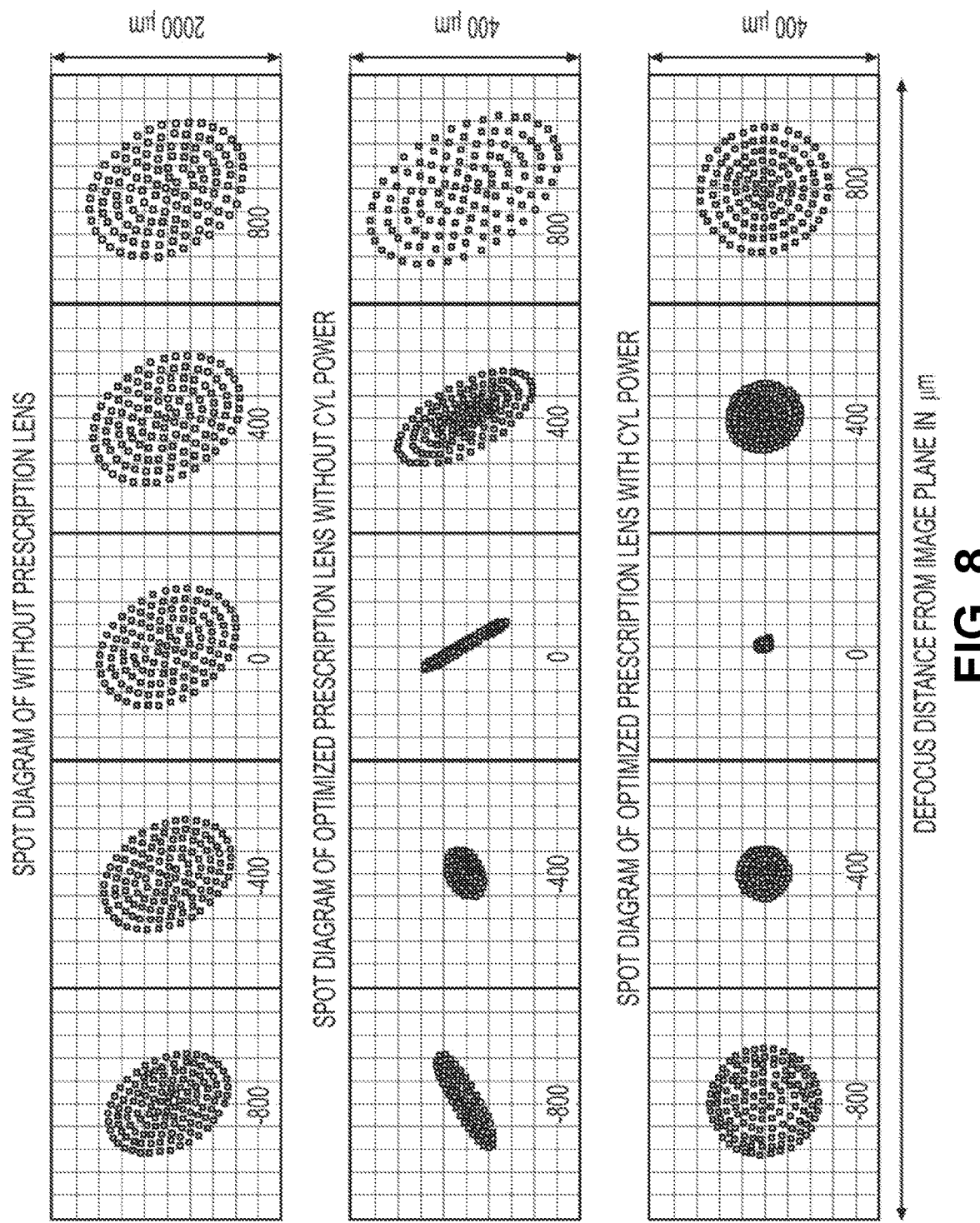
FIG. 8 illustrates an example of a spot diagram for a prescription lens with and without CYL power, in accordance with an embodiment.

In at least one embodiment, FIG. 8 shows a spot diagram change around the retina plane of a myopic astigmatism eye (SPH: -2, CYL: -2, and AXIS: 30) without and with the prescription lens. In at least one embodiment, compared to the naked eye and the myopia-only correction lens, the designed prescription lens forms a smaller focal point at the retinal plane as shown in FIG. 8. In at least one embodiment, FIG. 8 illustrates a spot diagram on the retina through focus shifting: (a) the blurred spot on the retina from the infinite object without prescription lens, (b) the focused spot on the retina only optimized for SPH, and (c) optimized for SPH, CYL, and AXIS.

$$r^*_x = \frac{r_y \times (Nd - 1)}{(Nd - 1) + CYL \times r_y} \quad (1)$$

In at least one embodiment, based at least in part on the prescription lens design, other geometric parameters ($R_{l1}$, $R_{l2}$, $R_{cy}$, a, $d_p$, $t_{BSL}$, $t_c$, $t_w$, $\theta_d$, $\theta_l$, $\theta_p$, $\theta_c$, $\theta_w$, $\theta_{free}$, and $S_{free}$) are optimized in the second phase. In at least one embodiment, although actual numbers will be calculated by a tool such as Zemax OpticStudio, the geometry of optics, the materials, the constraints, and the priority (merit function) should be carefully considered at the design stage for the best performance.

In at least one embodiment, FIG. 5 shows a detailed diagram of the AR display path. In at least one embodiment, in the waveguide, the light rays are reflected at the positive power surface ($S_f$) first, and at the negative power surface ($S_r$) second. In at least one embodiment, it is reasonable to choose a positive power image combiner ($S_{free}$) for the freeform surface to produce a flatter focal plane, symmetric power distribution, and less aberration. In at least one embodiment, the freeform surface is characterized by an extended polynomial equation including conic aspherical surfaces and extended polynomial terms as follows:

$$z = \frac{cr^2}{1 + \sqrt{1 - ((1 + k)c^2 r^2)}} + \sum_i^N A_i E_i(x, y), \quad (2)$$

where c is the curvature for the base sphere, r is the normal radius expressed as $r=\sqrt{x^2+y^2}$, k is the conic constant, N is the number of polynomial terms, and $A_i$ is the coefficient of the $i^{th}$ extended polynomial terms as Eq(3). In at least one embodiment, as part of the optimization in freeform surface, the $4^{th}$ polynomial has been considered, in which N=16 in the Eq(3) below.

$$\Sigma_{i=0}^N A_i E_i(x,y) = A_0 + A_1 x^1 y^0 + A_1 x^0 y^1 + A_3 x^2 y^0 + A_4 x^1 y^1 + A_5 x^0 y^2 + \quad (3)$$

In at least one embodiment, the bi-convex beam-shaping lens increases the system's numerical aperture (NA) for higher resolution and compactness (shorter optical path). In at least one embodiment, the in-coupling prism guides the light rays into the waveguide with the total internal reflection condition. In at least one embodiment, the y-axis only cylindrical surface ($R_{cy}$) inside the in-coupling prism compensates the astigmatism and the tilted image plane, which are caused by the off-axis folded path. In at least one embodiment, the tilted angle of the beam-shaping lens is identical to the tilted angle of the micro-display for the symmetric magnification ($\theta_d=\theta_l$), but the angles of other components were freely decided by the optimizer to maximize FOV and minimize aberration. In at least one embodiment, the materials for the beam shaping lens and the upper part of the in-coupling prism ($n_1$, $v_1$), the lower part of that ($n_2$, $v_2$), and the prescription lens ($n_3$, $v_3$), where n and v refer to index of refraction and Abbe number respectively, were carefully chosen to minimize the thicknesses and the chromatic aberration using the different dispersion characteristics. In at least one embodiment, the distances (a, $d_p$, $t_{BSL}$, $t_c$, $t_w$) were calculated to some non-negative values based on various constraints and the priorities.

In at least one embodiment, the optical configuration for AR function is limited by giving the constraints for the optical system in the Merit function. In at least one embodiment, the constraints are determined by the comprehensive consideration of lens implementation, distance from forehead, total internal reflection (TIR) inside prescription lens, and boundary on display panel. In at least one embodiment, the center thickness and edge thickness of each lens, $t_{BSL}$, $t_c$, $t_w$, are limited to more than one mm for the manufacturability of the lens. In at least one embodiment, constraints for the air thickness, a, dp, are limited to more than 0.2 mm to avoid the superposition of the lens. In at least one embodiment, the sum of thickness a, $d_p$, $t_{BSL}$, $t_c$, and $t_w$ are limited to within 8.5 mm to minimize total thickness of AR system.

FIGS. 10-11 illustrate an embodiment of the two-phase optimization of a prescription AR display. In at least one embodiment, the frontal and rear surfaces ($S_f$, $S_r$) are optimized at given lens thickness $t_l$ in the first step based on user's prescription. In at least one embodiment, other geometric parameters ($R_{f1}$, $R_{f2}$, $R_{cy}$, a, $d_p$, $t_{BSL}$, tc, $t_w$, $\theta_d$, $\theta_l$, $\theta_p$, $\theta_c$, $\theta_w$, and $\theta_{free}$) are optimized in the second step based on target foveated resolution and eye relief range $d_e$.

FIG. 10 illustrates an example of a process 1000 that, as a result of being performed, optimizes a prescription lens of a prescription AR display, in accordance with an embodiment. In at least one embodiment, at block 1002, a prescription is obtained for a wearer. The prescription may be, in various embodiments, a prescription for myopia, astigmatism, presbyopia, or various combinations of vision problems. In at least one embodiment, at block 1004, a mathematical model for the eye is generated in accordance with the obtained prescription. In the present document, an example for a myopic eye is presented. In at least one embodiment, at block 1006, a script for Zemax Studio macro as described below is executed with appropriate vision correction parameters. In at least one embodiment, at block 1008, the bifocal power and rotation angle of the z-axis in the cornea surface are determined. In at least one embodiment, at block 1010, the prescription lens surface is initialized, and at block 1012, the Merit function criterion is set. In at least one embodiment, at block 1014, the bifocal radius and rotated angle of the prescription lens surface is optimized, and at block 1016, optimization of the prescription portion of the AR display is complete.

Figure 9:
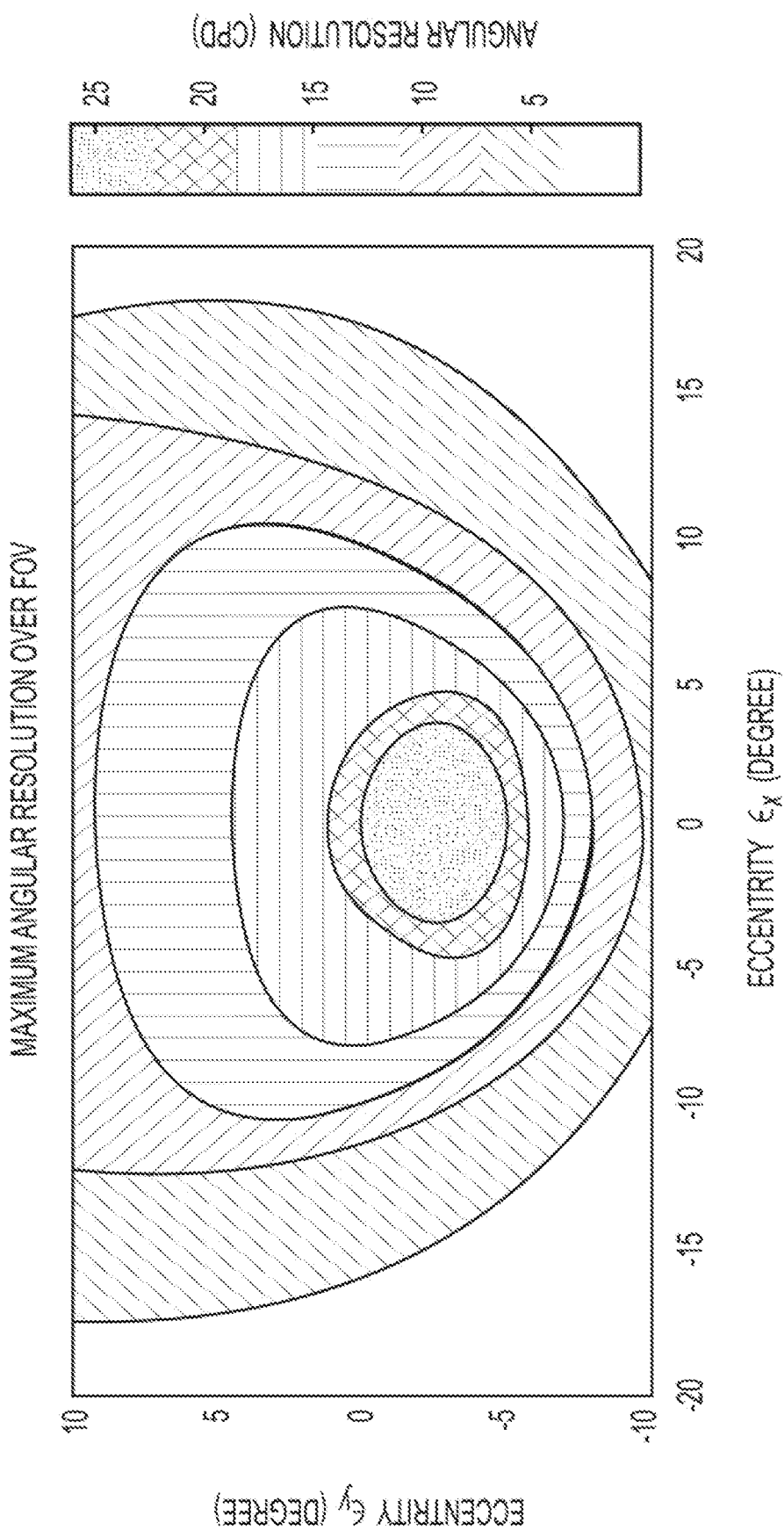
FIG. 9 illustrates an example of the angular resolution of a foveated AR display, in accordance with an embodiment.

FIG. 11 illustrates an example of a process 1100 that, as a result of being performed, optimizes an AR display of a prescription AR display, in accordance with an embodiment. In at least one embodiment, at block 1102, the prescription lens parameters determined above are obtained. In at least one embodiment, at block 1104, the relationship between the image combiner and the display panel is modeled. In at least one embodiment, the relationship establishes a foveated image that is presented to the wearer. In at least one embodiment, at block 1106, the parameters defining the AR display, including the image combiner, are determined. In at least one embodiment, at block 1108, the constant of the merit function is established. In at least one embodiment, at block 1110, the resolution distribution of the foveated display is set. In at least one embodiment, the resolution of the foveated display is achieved as a result of the electronic micro-display being flat, and the optics of the beam shaping lens and optical path correcting the shape of the display to match the image combiner. In at least one embodiment, the resolution density presented to the wearer is illustrated in FIG. 9. In at least one embodiment, at block 1112, the polynomial coefficient surface performance of the surface is optimized. In at least one embodiment, at block 1114, due to the adjustment of the foveated display, a center resolution of over 23 cycles per degree ("CPR") is achieved. In at least one embodiment, at block 1116, the AR display optimization is complete.

Figure 12:
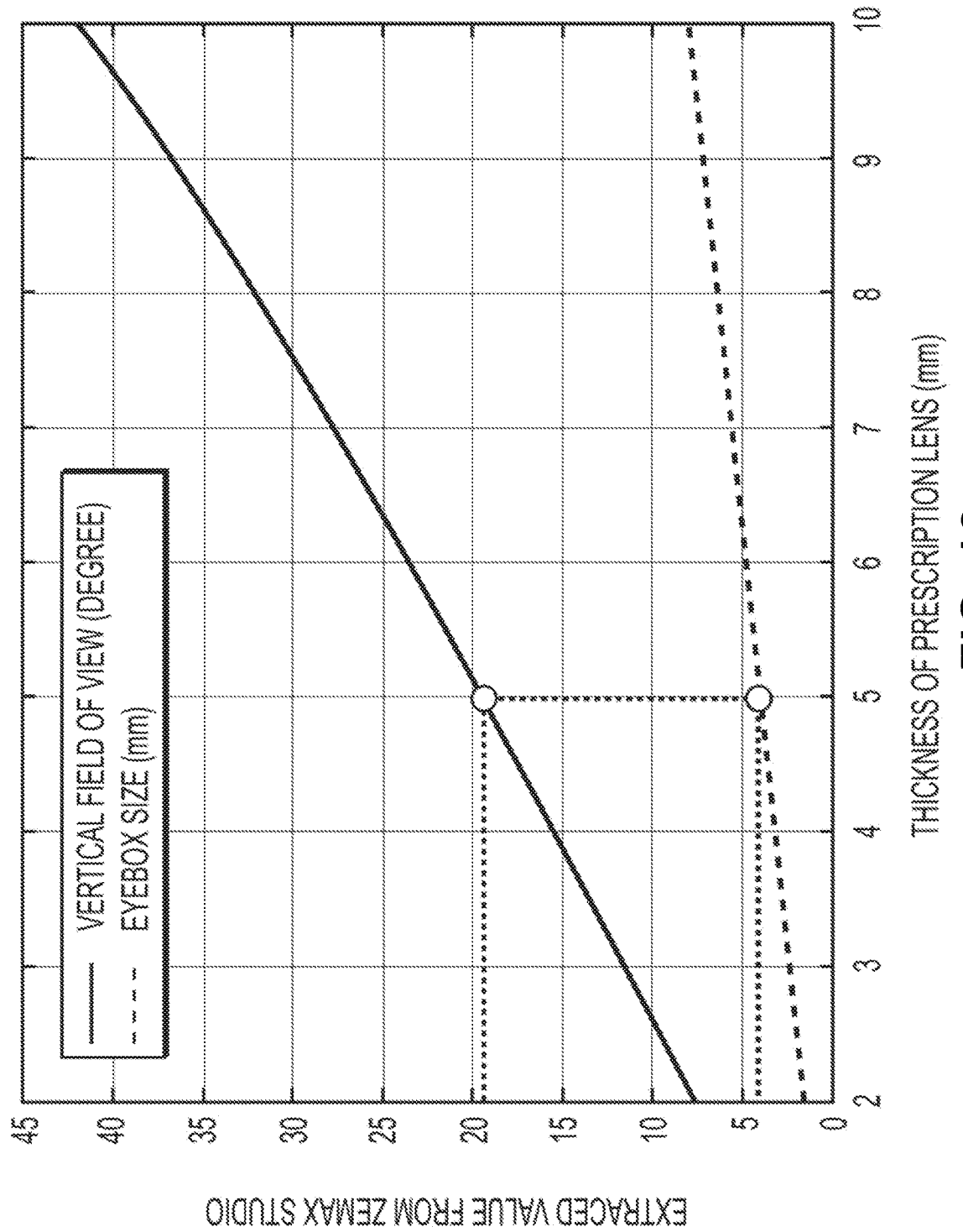
FIG. 12 illustrates an example of a design trade-off space for lens thickness and eye box size for a prescription AR display, in accordance with an embodiment.
Figure 13:
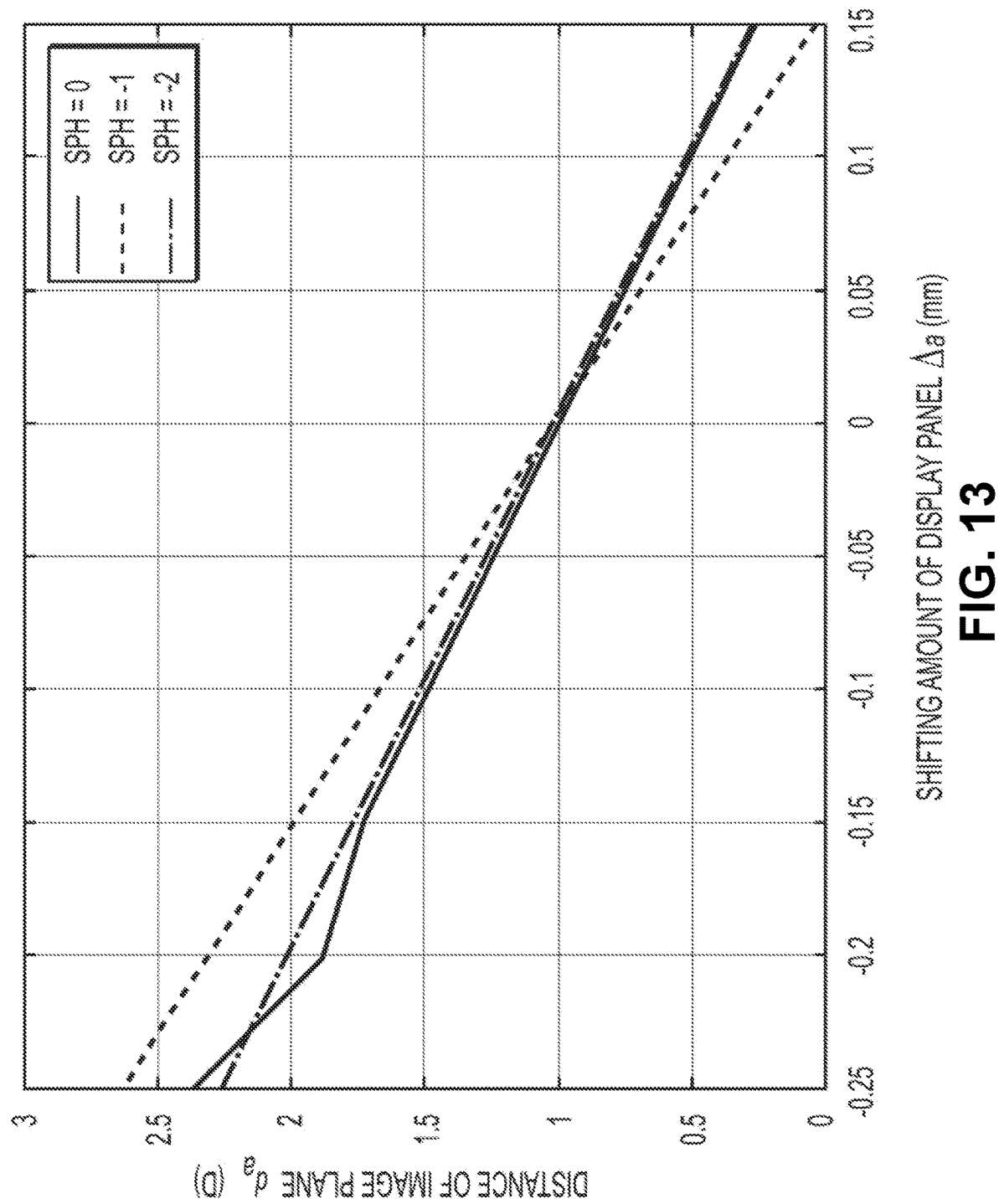
FIG. 13 illustrates an example of a correlation between a display panel shift and an image plane shift for a prescription AR display, in accordance with an embodiment.
Figure 14:
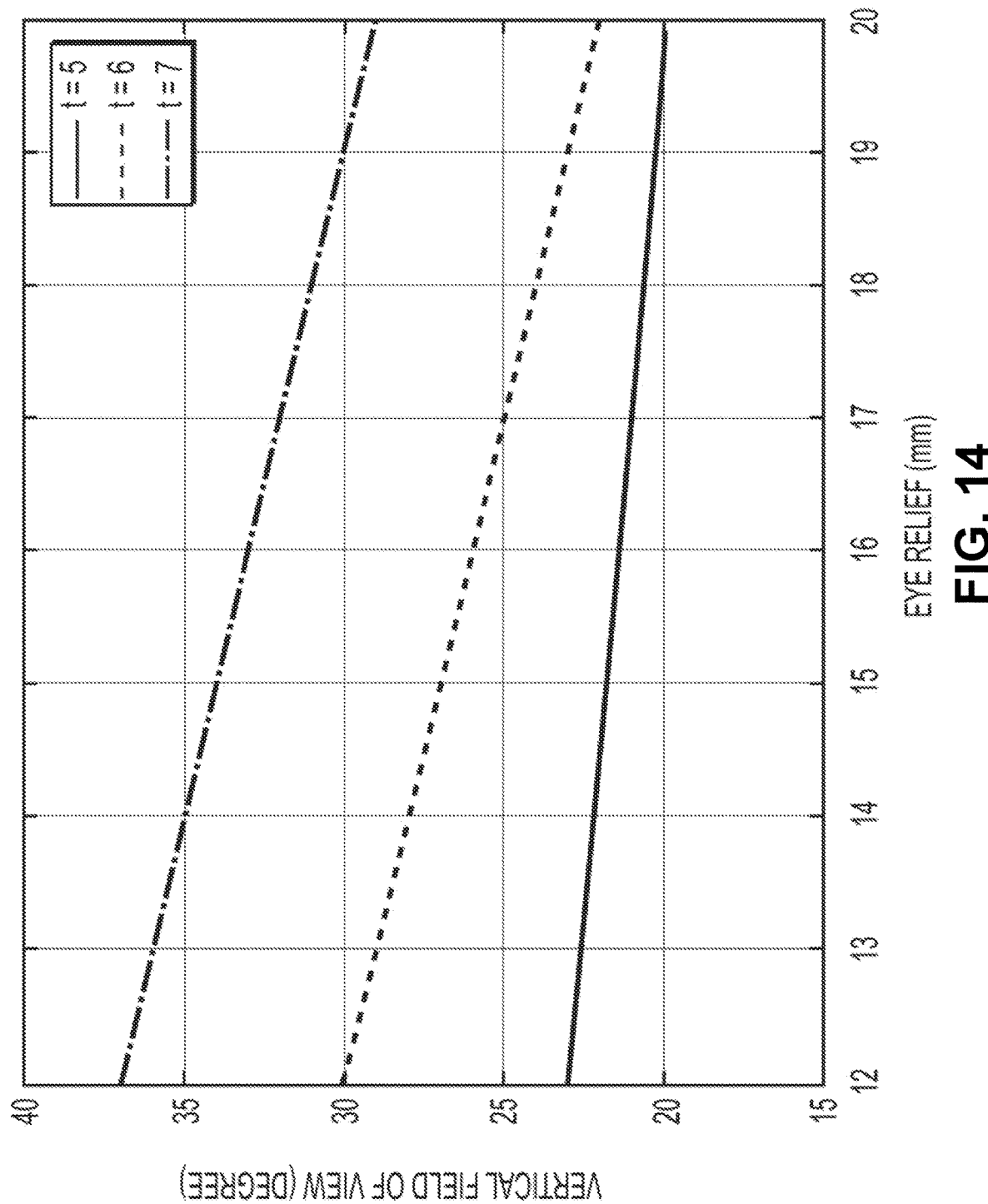
FIG. 14 illustrates an example of a design trade-off space for a vertical field of view and eye relief for a prescription AR display, in accordance with an embodiment.

In at least one embodiment, where the thickness of the prescription lens is 5 mm, the size of the free-form combiner is limited, especially in the vertical field of view. In at least one embodiment, the thicker prescription lens allows a larger field of view by the larger size of the combiner. In at least one embodiment, although it is complicated to evaluate the FoV from the free-form surface and reflection constraint of the light path, tools such as Zemax Studio provide an effective way to get the vertical field of view. As shown in FIGS. 12-14, the trend line is linear to the thickness of the prescription lens. In at least one embodiment, the eye box size grows with lens thickness.

FIGS. 12-14 illustrate an embodiment of a design trade-off space for the prescription AR display. In at least one embodiment, the micro display $w_d \times h_d = 10.08 \times 7.56$ mm and pixel pitch 6.3 μm, virtual image plane $d_i = 1D$, and thickness $t_l = 5$ mm. FIG. 12 illustrates thickness vs. FOV and eye box. In at least one embodiment, both FOV and eye box are proportional to the $t_l$. FIG. 13 illustrates focus cue. In at least one embodiment, the virtual image plane can be changed back and forth (Δd) with the axial movement of the micro display (Δa). FIG. 14 illustrates Eye Relief vs. FOV. In at least one embodiment, smaller eye relief provides larger FOV FIG. 9 illustrates an example of the angular resolution of a foveated AR display as viewed by the wearer, in accordance with an embodiment. In at least one embodiment, the AR display is a fixed foveated display. In at least one embodiment, the AR display is adjusted to the foveated resolution distribution, which presents a high angular resolution, 26 CPR, at the foveal region and a low angular resolution, 3 cpd, outside of foveated region in optics. In at least one embodiment, the panel used is a 6.3 μm micro-OLED, which can reach to 23 CPR of angular resolution. In at least one embodiment, an optimization is performed done in Zemax Studio by giving the foveated weight of optimized priority order for the field. In at least one embodiment, the special frequency date of MTF30 is extracted from Zemax Studio and the data is converted into angular resolution by calculating the field of view of the AR image, as shown in FIG. 9. In at least one embodiment, the high-resolution region is not symmetric because it is hard to perfectly compensate the AXIS angle of astigmatism. FIG. 9 illustrates foveated optimization of angular resolution over FOV for a 1D myopia prescription AR display.

In at least one embodiment, using the techniques described herein, a person of ordinary skill in the art is able to adjust the prescription AR display to correct for most vision problems including myopia, astigmatism, presbyopia, and various combinations these problems. In various embodiments, the prescription AR is adaptable to multiple myopia cases (0D (normal vision), 1D, 2D, 3D, 4D, and 5D) and a myopic astigmatism case (SPH=2D, CYL=2, AXIS=30). Table 2 shows design parameters for one embodiment of a 1D myopia Prescription AR display. Table 2 shows the geometric and optical parameters of one embodiment of prescription AR for 1D myopia.

TABLE 2

The designed performance of implemented prescription embedded AR display.

| Items | Units | Values |
| --- | --- | --- |
| Prescription | diopther | −1 |
| Lens thickness | mm | 5 |

TABLE 2-continued

The designed performance of implemented prescription embedded AR display.

| Items | Units | Values |
|---|---|---|
| Eye relief | mm | 20 |
| Eye box | mm | 4 |
| Image object | m, through the lens | 1 |
| Field of view | degrees | 20 × 40 |
| Resolution | cycles per degree(CPR) | 23 at center |

In at least one embodiment, the fabrication of the optical components may be accomplished with the following techniques. In at least one embodiment, since facial structure is unique to the wearer, the ergonomic frame design is as important as the optics design. In at least one embodiment, the optics for the eye relief of the AR display is optimized in the range of 12 mm to 20 mm. In at least one embodiment, however, smaller eye relief can provide a larger FOV and a more comfortable fit (closer center of mass). In at least one embodiment, the center of the pupil should be aligned with the optical axis for a superior foveated experience. In at least one embodiment, frame design of the glasses should be chosen in accordance with the wearer's interpupillary distance ("IPD") too.

In at least one embodiment, the facial structure of the intended wearer as illustrated in FIG. 1 is 3D-scanned with a 3D-Camera such as the Kinect sensor from Microsoft, and imported to 3D-rendering software (such as Fusion 360), and the glasses frame is designed and optimized for each user. In at least one embodiment, the glasses frame designs are parameterized with the input of the IPD and the width of the head, followed by fitting if the nose pieces.

In at least one embodiment, an OLED-based dynamic prototype was created with the following features. In at least one embodiment, two 10.08×7.56 mm Sony micro OLED (ECX339A) displays were used as binocular micro displays, where each display has 1600×1200 resolution, 6.3 μm pixel pitch, and maximum brightness 1000 cd/m2. In at least one embodiment, the free-form optics with the 70% transparency for 1D myopia were fabricated. In at least one embodiment, a 3D-printed frame housed and aligned the optical structures including main lens+in-coupling prism, beam-shaping lens, micro display, and driving board. In at least one embodiment, a 3D printed gear was also applied to change the IPD. In at least one embodiment, the weight of the dynamic prototype including the driving board was 164 g.

In at least one embodiment, an LUT-based static prototype was created with the following features. In at least one embodiment, two sets of a 10.08×7.56 mm, 3048 pixel per inch light valve technology (LUT) film with an ElectroLuminescent (EL) film back light were used for the static display. In at least one embodiment, a CR-2032 coin cell powered both EL films. In at least one embodiment, a 3D-printed housing aligned all of the optics, statics display modules, and the battery for wearable eye glasses form factor. In at least one embodiment, the weight of the static prototype was 79 g.

In at least one embodiment, the image content for the prototype is a binocular image. In at least one embodiment, the binocular image is produced by a G3D Innovation Engine which is a powerful rendering engine with the open source of C++ program. In at least one embodiment, the rendering engine supports the image rendering of virtual reality that allows the customer to add the scene by a virtual reality platform such as VRapp. In at least one embodiment, in the coding of the virtual reality platform, the field of view, depth of focus, pupillary distance, and resolution are set with same parameter of the prescription-embedded AR display. In at least one embodiment, the field of view measurement of the AR image covered 20 by 40 degrees in the vertical and horizontal direction respectively.

In at least one embodiment, the AR display achieves corrected vision. In an experiment conduced on a prototype of an embodiment, a scene for different real objects including a car, a horse, and an eye chart with a distance of 0.5 m, 1 m, and 3 m respectively, was used. In at least one embodiment, in order to imitate a wearer who has a 1 diopter myopia eye, the camera focused on the car in the scene without the prescription-embedded AR display. The clear details on the car show that a 1 diopter myopia eye is able to clearly view an object at 0.5 m. In at least one embodiment, using the prescription-embedded AR display, the focus point shifted to 1 m to target the horse, without changing the setting of focus on the camera. The focus shift amount demonstrates that the prescription lens has −1 diopter power. In at least one embodiment, a clear AR image is presented by the display panel at 1 m distance through the prescription embedded AR display, and the eye chart looks sharper due to the contribution of vision correction.

Figure 15:
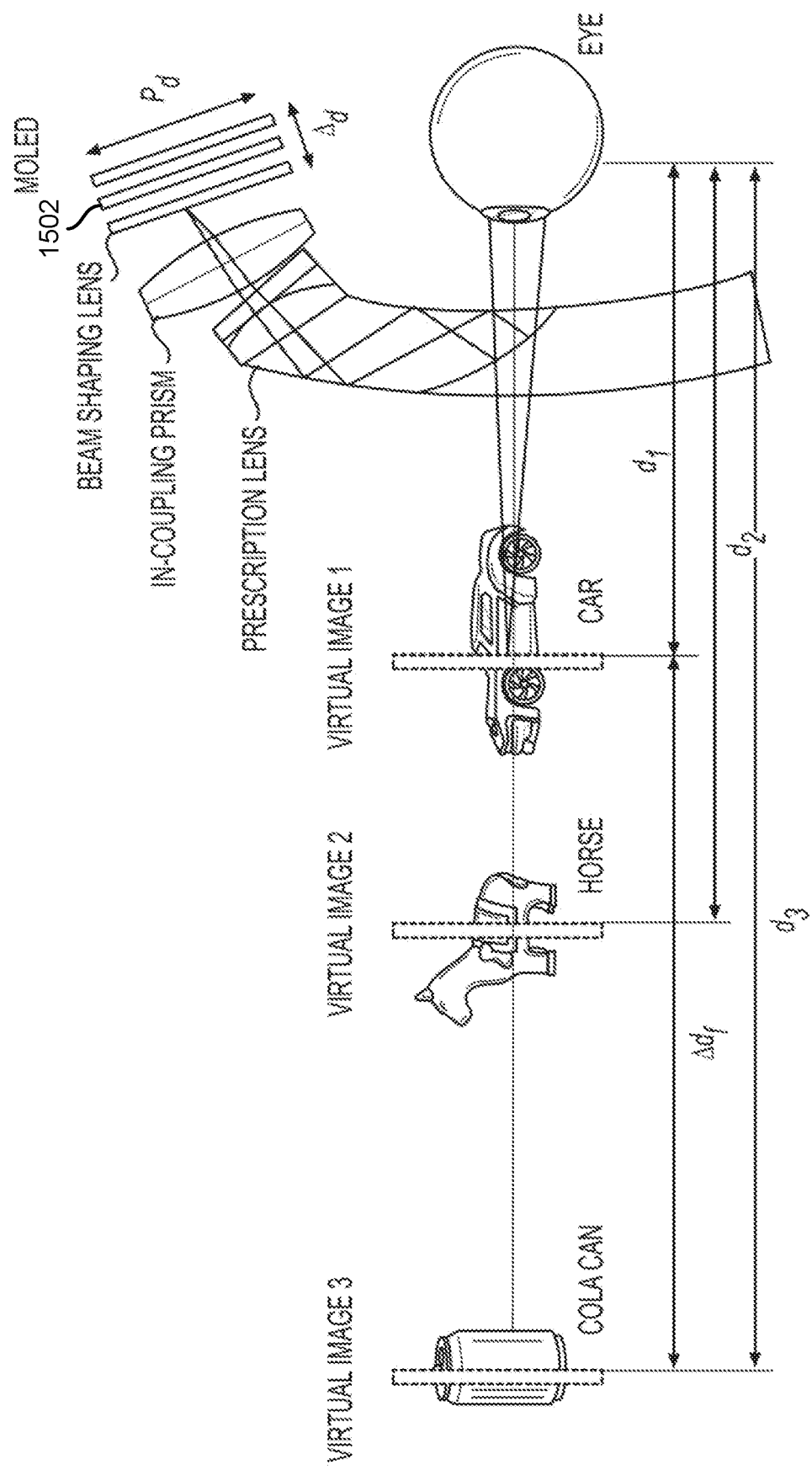
FIG. 15 illustrates an example of an AR display with an adjustable image position, in accordance with an embodiment.

FIG. 15 illustrates an example of an AR display with an adjustable image position, in accordance with an embodiment. In at least one embodiment, the AR display can be adapted to operate as a vari-focal AR display. As shown in FIG. 15, a three-position Micro-OLED ("MOLED") panel 1502 with size, Pd, and shifting distance, δd, makes the different depth of AR image at d1, d2, and d3 from the eye, where equal to 0.5 m, 1 m, and 3 m, respectively. In at least one embodiment, three kinds of thickness of assemblies for Micro-OLED panel provide the shifting amount of 0.3 mm, δd. In at least one embodiment, the depth of the clear AR image is controlled and produces a vari-focal display that reduces the problem of vergence and accommodation conflict (VAC) in the near-eye display system.

In at least one embodiment, a vision correction function is an important property in a near-eye display system. In at least one embodiment, an AR display is directly integrated into a prescription lens. In at least one embodiment, each individual AR display is adapted to include a customized prescription lens in accordance with a prescription of SPH, CYL, and AXIS. In at least one embodiment, the configuration of the optical components can be used for the myopia patient with 0 to −7 diopter, −2 diopter of astigmatism, and rotation angle of astigmatism.

In at least one embodiment, a free-form image combiner is made by molding a prescription lens in two pieces and coating the interface between the two pieces with anti-reflective coating and 30% of ND filter coating. In at least one embodiment, the system achieves a field of view of 20 by 40 degrees and a foveated resolution distribution of 23 CPR in the foveal region. In at least one embodiment, the eye box size is 4 mm. In at least one embodiment, the prescription-embedded AR display described herein offers both corrected vision and a clear AR image at 1 m. In at least one embodiment, the depth of the AR image is adjustable from 0.5 m to 3 m by applying a corresponding 0.3 mm shift to the position of the display panel.

In at least one embodiment, the prescription embedded AR display is a compact design, which provides a volume of 6.5 cm3 for the optical engine, including the 5 mm thickness prescription lens, other optical elements, and a micro-OLED. In at least one embodiment, the prescription embedded AR display achieves vision correction for the environment scene and also gives a clear AR image for the wearer.

Figure 16:
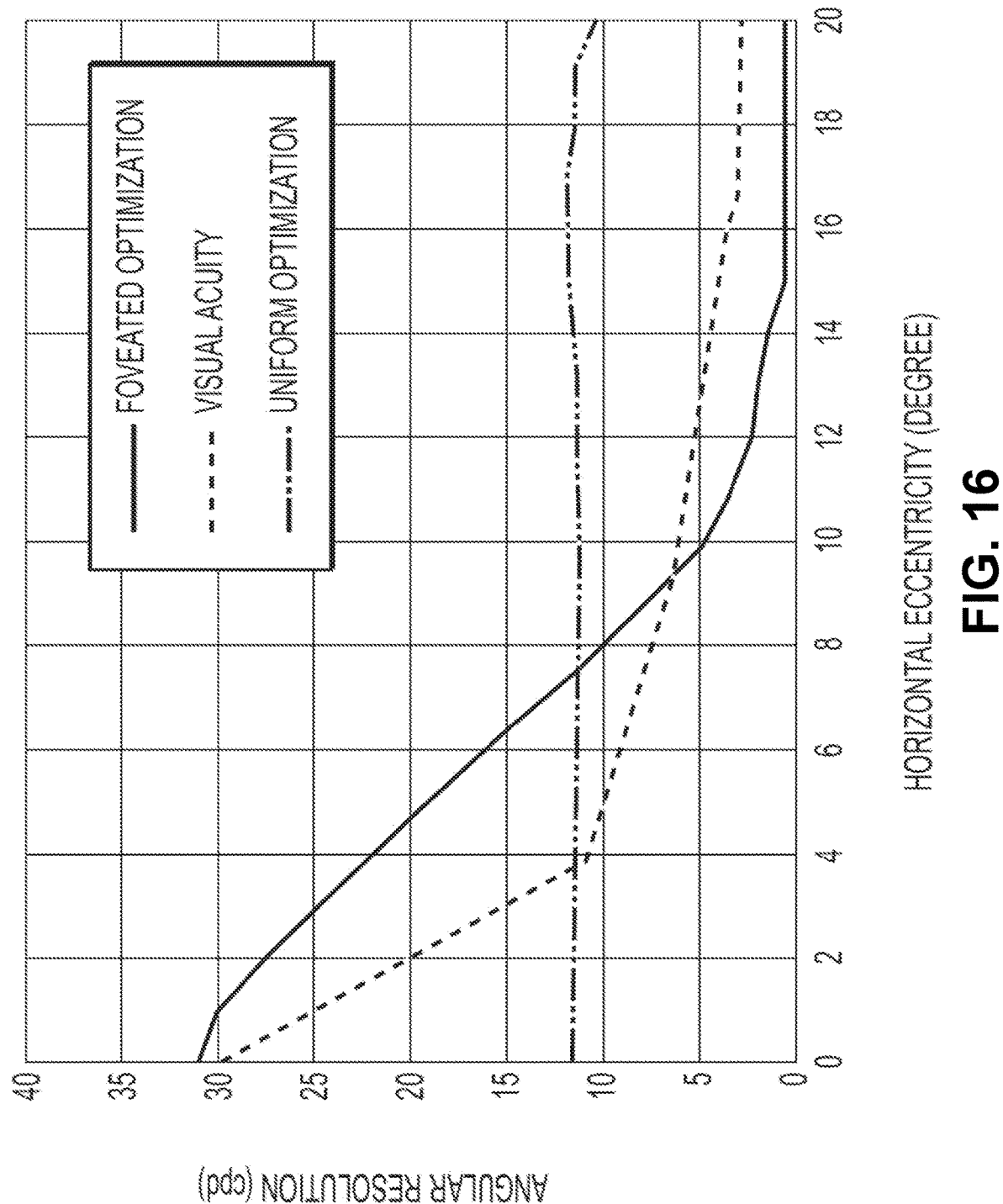
FIG. 16 illustrates an example of the angular resolution of a foveated display, in accordance with an embodiment.

FIG. 16 illustrates an example of the angular resolution of a foveated display, in accordance with an embodiment. The graph illustrates an embodiment where the perceived resolution of AR content is higher toward the center of the field of view and lower toward the edges of the field of view.

Figure 17:
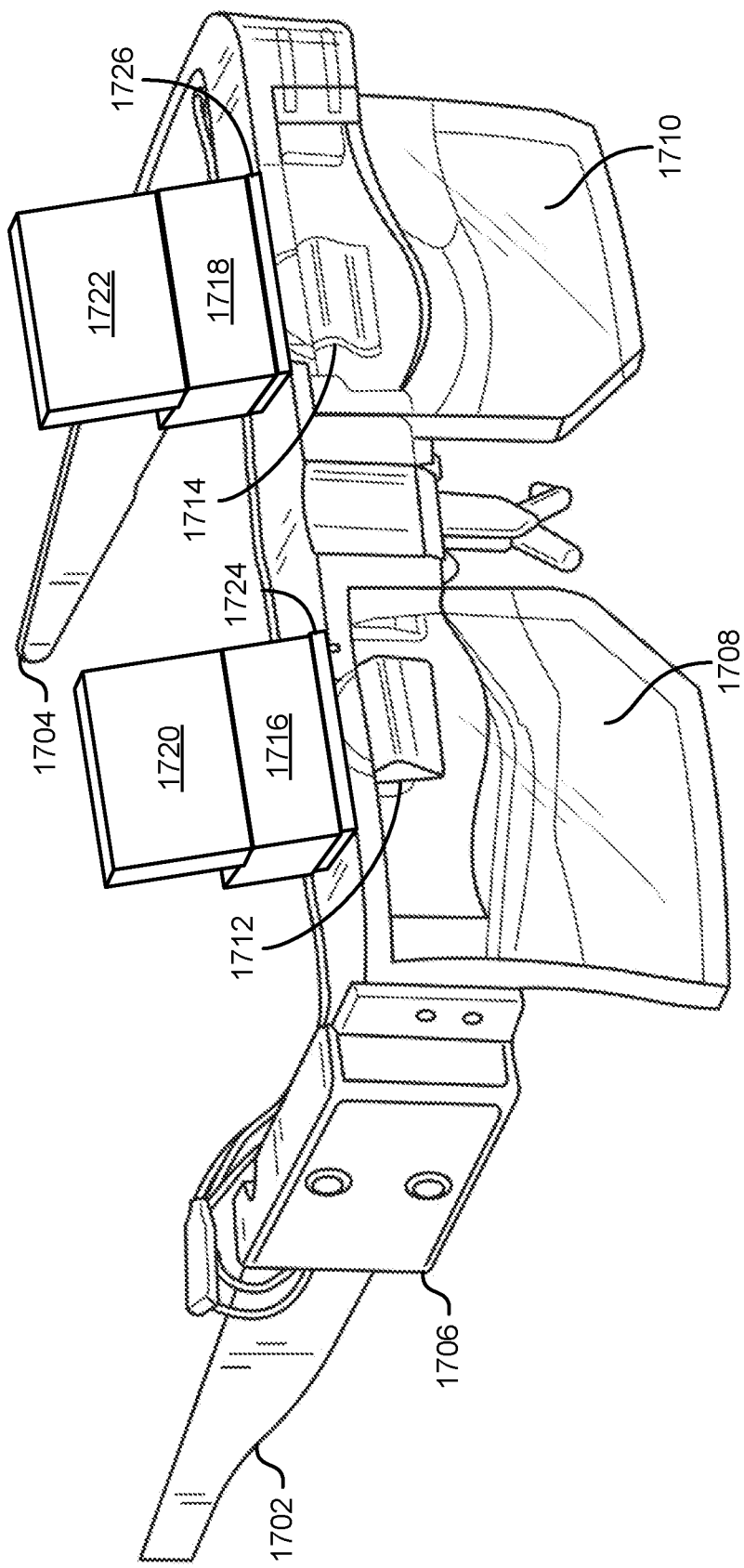
FIG. 17 illustrates an example of a modular augmented reality display with an upward configuration that allows the separate use of a prescription eyeglass component, in accordance with an embodiment.

FIG. 17 illustrates an example of a modular augmented reality display with an upward configuration that allows the separate use a prescription eyeglass component, in accordance with an embodiment. In at least one embodiment, the augmented reality display is produced in an eyeglass form factor having a frame with two arms 1702 and 1704. In at least one embodiment, a power and control unit 1706 drives a pair of electronic displays 1716 and 1718 removably mounted to the top of the frame. In at least one embodiment, the power and control unit 1706 includes one or more buttons to allow control of the display by the wearer. In at least one embodiment, the power and control unit 1706 is connected to a remote support pack worn by the user that includes a battery, microcomputer, and wireless interface. In at least one embodiment, the microcomputer may include a CPU or GPU as described in FIGS. 22 through 26. In at least one embodiment, the augmented reality display includes two lenses 1708 and 1710 that include an image combiner within each lens. In at least one embodiment, the image combiner combines the image transmitted through the lens with the image created by the electronic display. In at least one embodiment, the augmented reality display includes a beam-shaping lens and prism (1712 and 1714) in each lens that directs the image produced by the electronic display downward into the lens such that the image is internally reflected and directed to the image combiner of each lens.

In at least one embodiment, the AR display includes connectors 1724 and 1726 that allow the removal and attachment of the electronic displays 1716 and 1718. In at least one embodiment, the connectors 1724 and 1726 are magnetic attachments. In at least one embodiment, the magnetic attachments include conductors that transmit electrical signals to and from the control unit and/or the support pack. In at least one embodiment, the connectors are a clip, clasp, or slot that retain the electronic displays 1716 and 1718. In at least one embodiment, the connectors 1724 and 1726 include indexing features or keyways that aid in aligning the electronic displays 1716 and 1718 with the lenses 1708 and 1710. In at least one embodiment, the eyeglasses include mechanical alignment features to aid in attaching the display to the AR display to the eyeglasses. In at least one embodiment, mechanical alignment is achieved using a mortise and tenon, one or more groves and ridges, or pins and matching holes. In at least one embodiment, the electronic displays 1716 and 1718 include an organic light emitting diode ("OLED") display element coupled to one or more lenses and or prisms to direct and shape an image.

In at least one embodiment, a pair of driving boards 1720 and 1722 are attached to the electronic displays 1716 and 1718. In at least one embodiment, each driving board includes interface circuits and driving circuits for an OLED display. In at least one embodiment, the pair of driving boards 1720 and 1722 project upwards above the lenses. In at least one embodiment, the driving boards connect to the electronic displays 1716 and 1718 via edge connectors.

In at least one embodiment, the control unit 1706 includes a battery, microcomputer, and interface for communicating with a server computer system. In at least one embodiment, the interface is a wireless Bluetooth or WiFi interface. In at least one embodiment, the control unit 1706 relays display information from the server computer system to the pair of driving boards 1720 and 1722. In at least one embodiment, the control unit 1706 is removable in addition to other AR components to reduce the weight of the eyewear when AR features are not needed.

Figure 18:
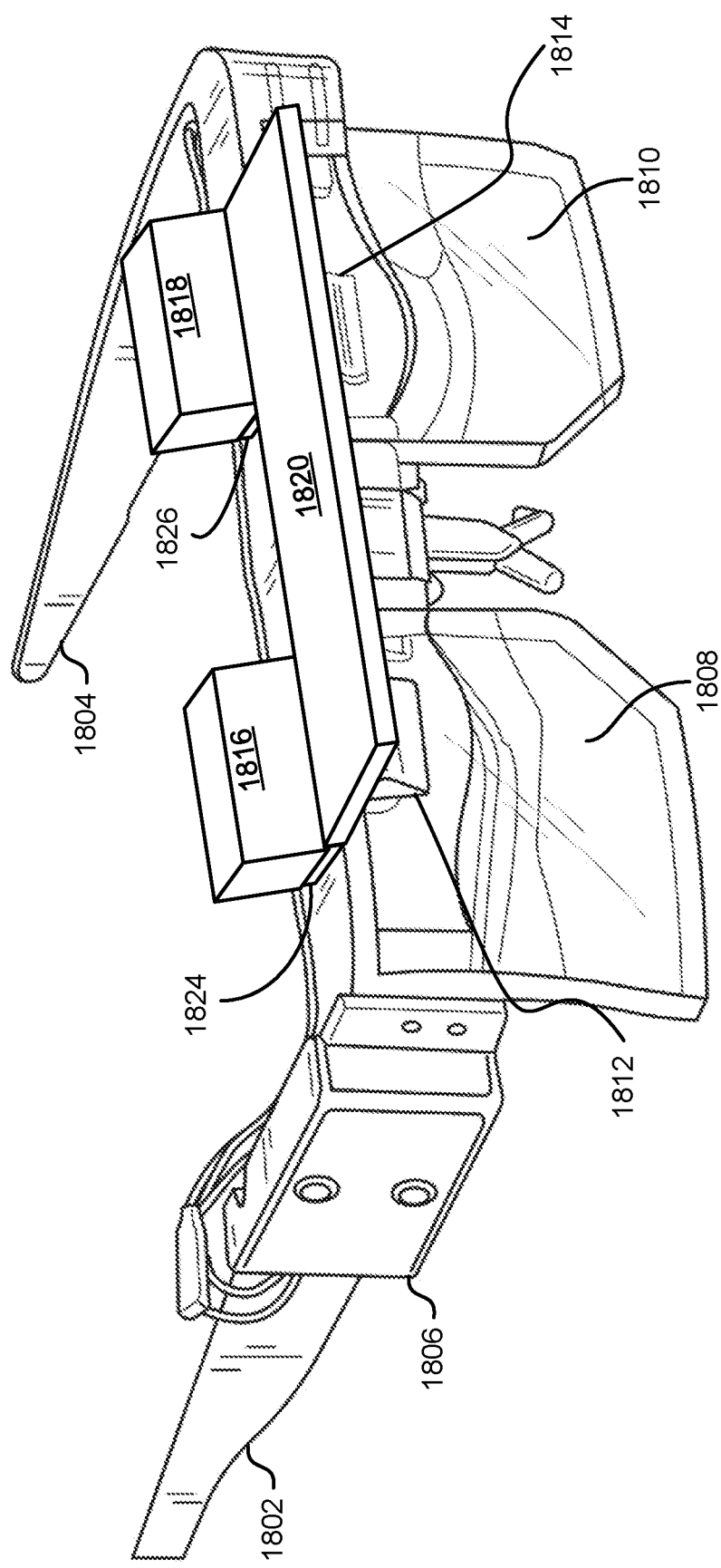
FIG. 18 illustrates an example of a modular augmented reality display with an outward configuration that allows the separate use of a prescription eyeglass component, in accordance with an embodiment.

FIG. 18 illustrates an example of a modular augmented reality display with an outward configuration that allows the separate use of prescription eyeglass component, in accordance with an embodiment. In at least one embodiment, the augmented reality display is produced in an eyeglass form factor having a frame with two arms 1802 and 1804. In at least one embodiment, a power and control unit 1806 drives a pair of electronic displays 1816 and 1818 removably mounted to the top of the frame. In at least one embodiment, the power and control unit 1806 includes one or more buttons to allow control of the display by the wearer. In at least one embodiment, the power and c is connected to a remote support pack worn by the user that includes a battery, microcomputer, and wireless interface. In at least one embodiment, the microcomputer may include a CPU or GPU as described in FIGS. 22 through 26. In at least one embodiment, the augmented reality display includes two lenses 1808 and 1810 that include an image combiner within each lens. In at least one embodiment, the image combiner combines the image transmitted through the lens with the image created by the electronic display. In at least one embodiment, the augmented reality display includes a beam-shaping lens and prism (1812 and 1814) in each lens that directs the image produced by the electronic display downward into the lens such that the image is internally reflected and directed to the image combiner of each lens.

In at least one embodiment, the AR display includes connectors 1824 and 1826 that allow the removal and attachment of the electronic displays 1816 and 1818. In at least one embodiment, the connectors 1824 and 1826 are magnetic attachments. In at least one embodiment, the magnetic attachments include conductors that transmit electrical signals to and from the control unit and/or the support pack. In at least one embodiment, the connectors are a clip, clasp, or slot that retain the electronic displays 1816 and 1818. In at least one embodiment, the connectors 1824 and 1826 include indexing features or keyways that aid in aligning the electronic displays 1816 and 1818 with the lenses 1808 and 1810. In at least one embodiment, the electronic displays 1816 and 1818 include an organic light emitting diode ("OLED") display element coupled to one or more lenses and or prisms to direct and shape an image.

In at least one embodiment, a driving board 1820 is attached to the electronic displays 1816 and 1818. In at least one embodiment, each driving board includes interface circuits and driving circuits for an OLED display. In at least one embodiment, the driving board 1820 projects outwards from the lenses. In at least one embodiment, the driving board 1820 connects to the electronic displays 1816 and 1818 via edge connectors. In at least one embodiment, the driving board 1820 is connected via a hinged connector allowing the board to pivot on an axis along the top of the eyeglasses. By allowing the driving board 1820 to pivot up and down, the position of the driving board 1820 can be adjusted to allow for the user wearing a hat with the AR display.

In at least one embodiment, the control unit 1806 is integrated into the support pack, and display signals are transmitted from the control pack to the driving board 1820 and the electronic displays 1816 and 1818. In at least one embodiment, the support pack includes user interface buttons that control the operation of the AR display.

Figure 19:
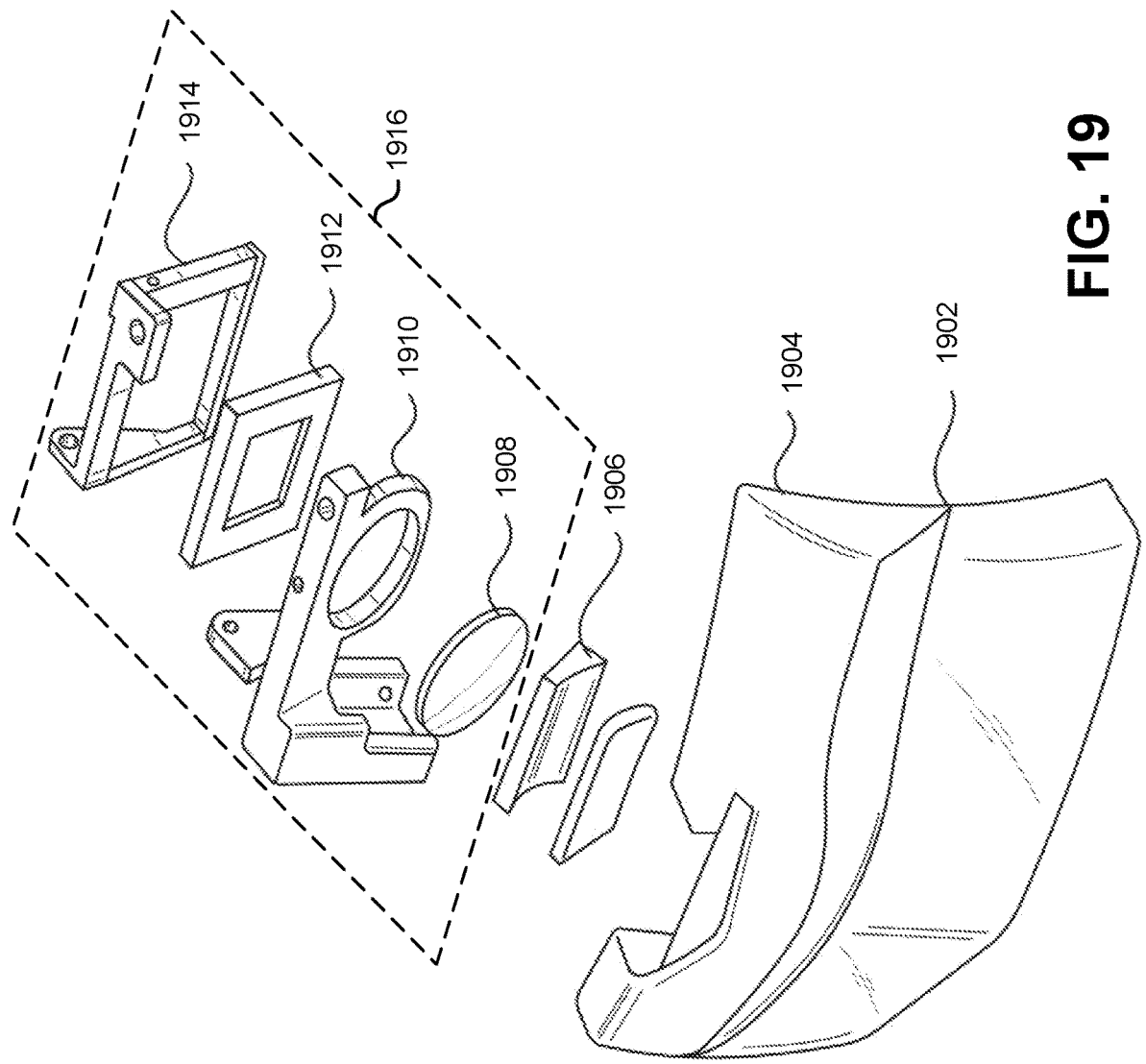
FIG. 19 illustrates an example of a detachable display assembly of an augmented reality display, in accordance with an embodiment.

FIG. 19 illustrates an example of a detachable display assembly 1916 of an augmented reality display, in accordance with an embodiment. In at least one embodiment, the augmented reality display includes a free-form image combiner 1902 embedded within a prescription lens 1904. In at least one embodiment, the prescription lens 1904 is fabricated in accordance with a vision correction prescription. In at least one embodiment, the free-form image combiner 1902 is made by coating the interface between two parts of the prescription lens 1904 with a half-silver material and joining the parts with optical glue. In at least one embodiment, the lens assembly includes an in-coupling prism 1906.

In at least one embodiment, the detachable display assembly 1916 includes a beam-shaping lens 1908 that directs an image produced by a micro LED 1912 into the edge of the prescription lens 1904. In at least one embodiment, the beam-shaping lens 408 is retained in position by a lens holder 1910 removably attached to a frame of the augmented reality display. In at least one embodiment, the detachable display assembly 1916 is attached to the prescription lens 1904 with a magnetic attachment or mechanical clip. In at least one embodiment, the micro-LED is held in pace with a panel holder 1914. In at least one embodiment, the panel holder 1914 includes a manual or electronic actuator that allows the micro-LED to be moved along the optical axis of the beam-shaping lens. In at least one embodiment, movement of the micro-LED panel is accomplished with a thumbscrew attached to the threaded rod. In at least one embodiment, movement of the micro LED panel is accomplished using an ultra-thin auto focus actuator module ("UTAF").

Figure 20:
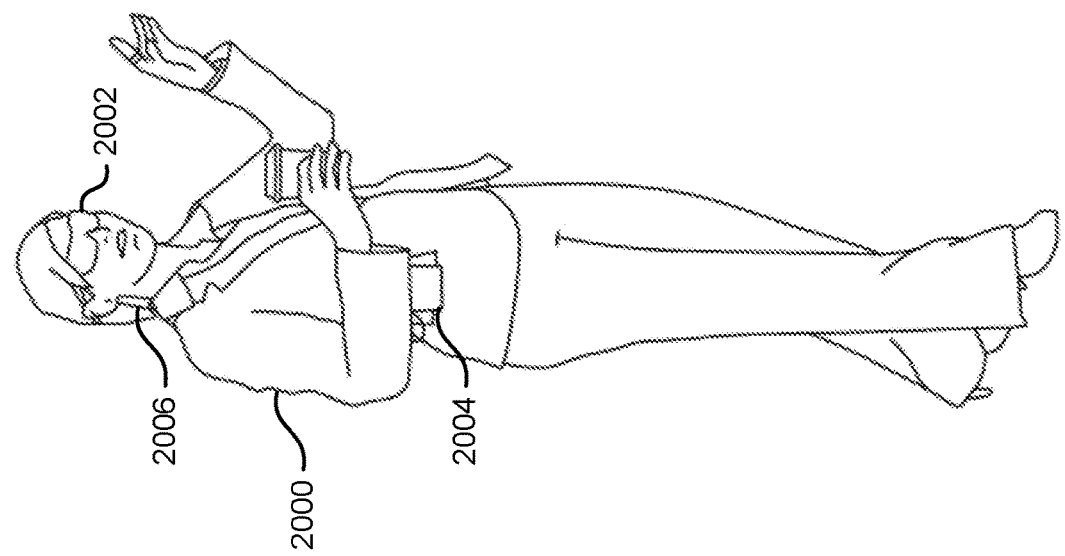
FIG. 20 illustrates an example of a modular augmented reality display being worn by a user, in accordance with an embodiment.

FIG. 20 illustrates an example of a modular augmented reality display being worn by a user, in accordance with an embodiment. In at least one embodiment, a user 2000 is wearing an AR display 2002 that integrated with a set of prescription eyewear. In at least one embodiment, the user 2000 wears a support pack 2004 which is connected to the AR display 2002 via an electrical cable 2006. In at least one embodiment, the support pack 2004 includes a battery, microcomputer, and wireless interface capable of communicating with a server that provides display information. In at least one embodiment, the wireless interface is an 802.11 or WiFi interface. In at least one embodiment, the wireless interface is a Bluetooth interface. In at least one embodiment, the electrical cable 2006 is replaced or augmented by a Bluetooth or near-field wireless connection between the support pack 2004 and the AR display 2002.

In at least one embodiment, by moving various components to the support pack 2004, the weight of the remaining components which are worn on the users' head are approximately 50-100 grams. In at least one embodiment, the weight of the prescription eyewear only, without AR-related components is less than 50 grams. It has been suggested that people that wear prescription eyewear generally must do so for about 16 hours per day, and that in this extended use, a weight of more than 50 g becomes uncomfortable for many users. By moving heavy components such as the battery to the support pack 2004, the AR headset can be comfortably used for many hours. If AR features are not needed, in some embodiments, the display drivers and OLED displays may be detached from the eyewear reducing the weight of the eyewear even more.

Figure 21:
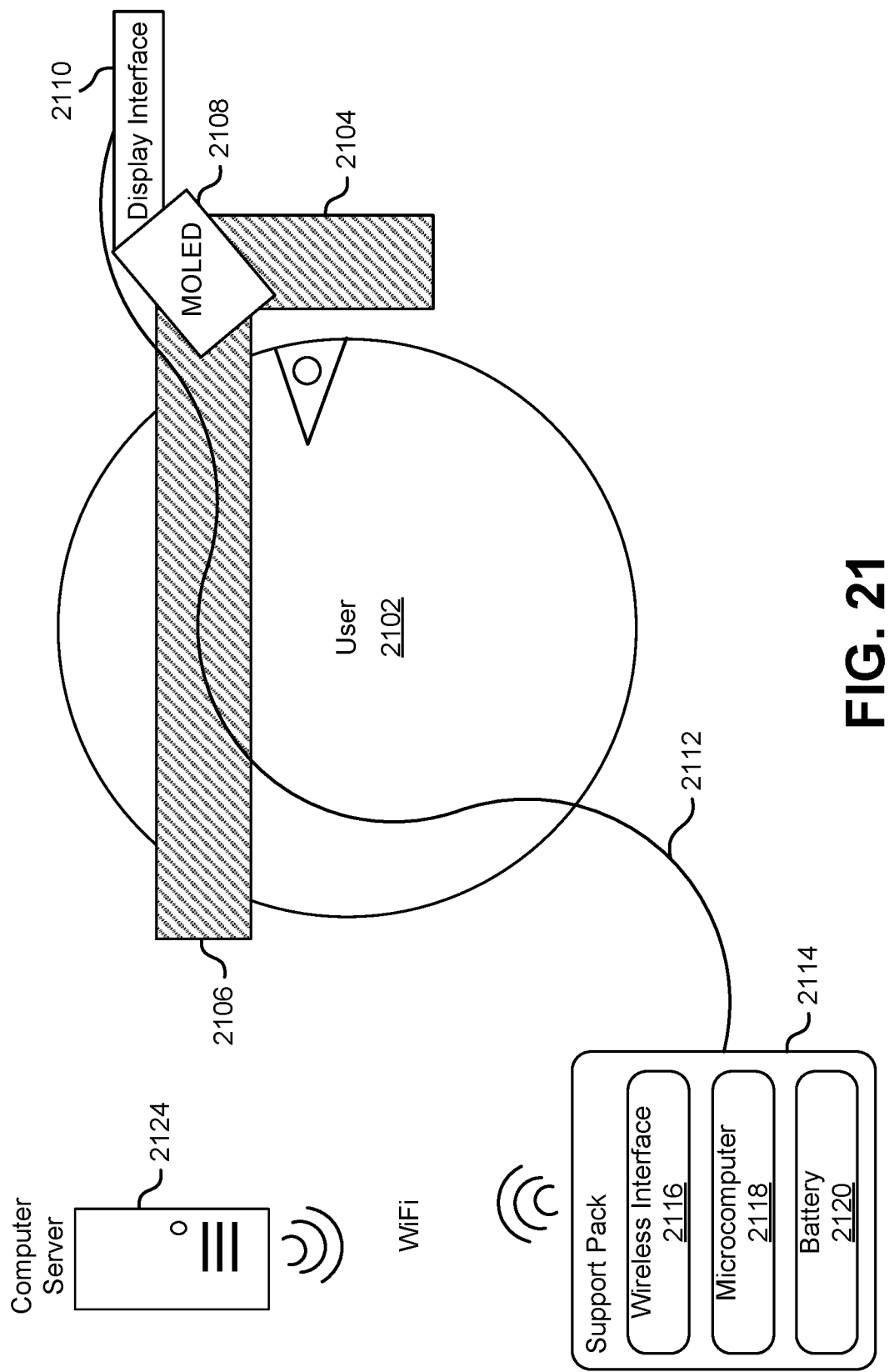
FIG. 21 illustrates an example of a modular augmented reality display that communicates with a computer server, in accordance with an embodiment.

FIG. 21 illustrates an example of a modular augmented reality display that communicates with a computer server, in accordance with an embodiment. In at least one embodiment, a user 2102 wears an AR display that includes a pair of arms 2106 and a prescription lens 2104, such as a prescription AR display described above. In at least one embodiment, the AR display includes a micro organic light emitting diode ("MOLED") display 2108 and a display interface 2110 coupled to the display 2108. In at least one example, the display 2108 may be an LED, AMOLED, or LCD display. In at least one embodiment, the display interface 2110 and MOLED display 2109 are removable by the user 2102, so that the prescription AR display can be used as a set of prescription eyewear without AR functionality. In at least one embodiment, the resulting eyewear is lightened, increasing comfort for the user 2102.

In various examples the display interface 2110 includes an electrical interface that communicates with a support pack 2114 via a cable 2112. In at least one embodiment, the display interface includes electronic video display driver circuitry that converts signals obtained from the support pack 2114 into image data that is provided to the display 2108. In at least one embodiment, the display 2108 converts the image data into images that are displayed to the user 2102 via the prescription lens 2104 as described above.

In at least one embodiment, the support pack 2114 includes a wireless interface 2116, a battery 2120, and a microcomputer 2118. In at least one embodiment, the microcomputer 2118 may be a computer system having one or more processors and memory containing instructions that, as a result of being executed by the one or more processors, case the microcomputer 2118 to acquire information from a computer server 2124, process the information, and send display information to the display interface 2110. In at least one embodiment, the battery 2120 is a lithium ion, NiCad, Alkaline or other battery that provides power to the support pack. In some examples, the battery 2120 supplies power to the display interface 2110 and display 2108 via the cable 2112. In some examples, the cable 2112 supplies both serial data and power to the display interface 2110 over a single wire of the cable 2112.

In at least one embodiment, the support pack 2114 communicates with the computer server 2124 using the wireless interface 2116. In at least one embodiment, the wireless interface is a WiFi, cellular, or Bluetooth interface. In at least one embodiment, the computer server 2124 provides display information to the AR display via the support pack 2114. The support pack lightens the weight on the user's 2102 head when AR images are being used. By providing a wireless connection between the support pack 2114 and the computer server 2124, freedom of movement is provided to the user 2102 while using the AR display.

FIGS. 22-26 illustrate various systems that can be used to implement various embodiments of the invention. The systems illustrated and discussed in connection with FIGS. 22-26 may be used, for example, to execute instructions to perform algorithms discussed herein including but not limited to image processing (e.g., object detection, object recognition, image segmentation, and other techniques) and calculating display information (e.g., the display to be rendered and/or a portion thereof, such as content to be added to an image captured through one or more cameras). Software to implement the various techniques described herein can be executed using one or more of the systems discussed below and illustrated in connection with FIGS. 22-26.

In at least one embodiment, the AR display includes an electronic display such as an organic light emitting diode ("OLED"), light emitting diode ("LED"), light valve technology ("LUT") display, or liquid crystal display ("LCD"). In at least one embodiment, the electronic display produces an image which is directed through a beam-shaping lens and in-coupling prism into the edge of the lens of the AR display. In at least one embodiment, the image is internally reflected within the lens by the surfaces of the lens until the image encounters a free-form image combiner located internally to the lens. In at least one embodiment, the surface profile of the image combiner is constructed as described herein so that both the image transmitted through the lens, and the image generated by the AR display are presented to a wearer in accordance with a vision prescription for corrective eyewear.

In at least one embodiment, a computer system with one or more processors is coupled to the electronic display, and the computer system includes memory and instructions that, when executed, cause the computer system to generate electrical signals that are transmitted to the electronic display. In at least one embodiment, the electrical signals are converted by the electrical display into an image. In at least one embodiment, an augmented reality graphics framework such as Spark AR, Wikitude, ARKit or ARCore on the computer system allows an application developer to create software, that when run on the computer system, directs the addition of augmented reality elements on the AR display.

Figure 22:
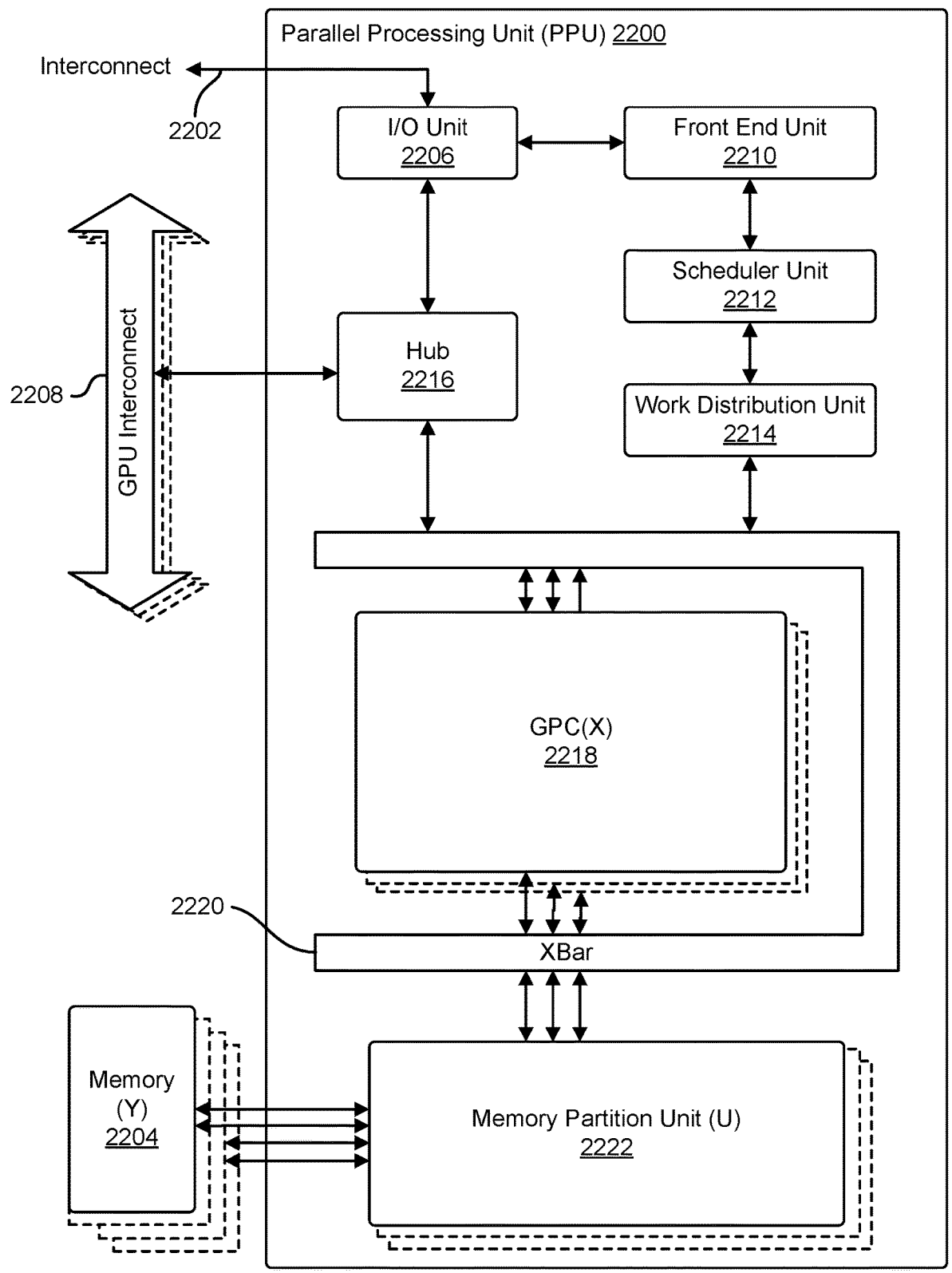
FIG. 22 illustrates an example of a parallel processing unit ("PPU"), in accordance with an embodiment.

FIG. 22 illustrates a parallel processing unit ("PPU") 2200, in accordance with one embodiment. In an embodiment, the PPU 2200 is configured with machine-readable code that, if executed by the PPU, causes the PPU to perform some or all of the processes and techniques described throughout this disclosure. In an embodiment, the PPU 2200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 2200. In an embodiment, the PPU 2200 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 2200 is utilized to perform computations such as linear algebra operations and machine-learning operations. FIG. 22 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 2200 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 2200 includes an Input/Output ("I/O") unit 2206, a front-end unit 2210, a scheduler unit 2212, a work distribution unit 2214, a hub 2216, a crossbar ("Xbar") 2220, one or more general processing clusters ("GPCs") 2218, and one or more partition units 2222. In an embodiment, the PPU 2200 is connected to a host processor or other PPUs 2200 via one or more high-speed GPU interconnects 2208. In an embodiment, the PPU 2200 is connected to a host processor or other peripheral devices via an interconnect 2202. In an embodiment, the PPU 2200 is connected to a local memory comprising one or more memory devices 2204. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 2208 may refer to a wire-based multi-lane communications link that is used by systems to scale and include one or more PPUs 2200 combined with one or more CPUs, supports cache coherence between the PPUs 2200 and CPUs, and CPU mastering. In an embodiment, data and/or commands are transmitted by the high-speed GPU interconnect 2208 through the hub 2216 to/from other units of the PPU 2200 such as one or more copy engines, video encoders, video decoders, power management units, and other components which may not be explicitly illustrated in FIG. 22.

In an embodiment, the I/O unit 2206 is configured to transmit and receive communications (e.g., commands, data) from a host processor (not illustrated in FIG. 22) over the interconnect 2202. In an embodiment, the I/O unit 2206 communicates with the host processor directly via the interconnect 2202 or through one or more intermediate devices such as a memory bridge. In an embodiment, the I/O unit 2206 may communicate with one or more other processors, such as one or more of the PPUs 2200 via the interconnect 2202. In an embodiment, the I/O unit 2206 implements a Peripheral Component Interconnect Express ("PCIe") interface for communications over a PCIe bus. In an embodiment, the I/O unit 2206 implements interfaces for communicating with external devices.

In an embodiment, the I/O unit 2206 decodes packets received via the interconnect 2202. In an embodiment, at least some packets represent commands configured to cause the PPU 2200 to perform various operations. In an embodiment, the I/O unit 2206 transmits the decoded commands to various other units of the PPU 2200 as specified by the commands. In an embodiment, commands are transmitted to the front-end unit 2210 and/or transmitted to the hub 2216 or other units of the PPU 2200 such as one or more copy engines, a video encoder, a video decoder, a power management unit, etc. (not explicitly illustrated in FIG. 22). In an embodiment, the I/O unit 2206 is configured to route communications between and among the various logical units of the PPU 2200.

In an embodiment, a program executed by the host processor encodes a command stream in a buffer that provides workloads to the PPU 2200 for processing. In an embodiment, a workload comprises instructions and data to be processed by those instructions. In an embodiment, the buffer is a region in a memory that is accessible (e.g., read/write) by both the host processor and the PPU 2200—the host interface unit may be configured to access the buffer in a system memory connected to the interconnect 2202 via memory requests transmitted over the interconnect 2202 by the I/O unit 2206. In an embodiment, the host processor writes the command stream to the buffer and then transmits a pointer to the start of the command stream to the PPU 2200 such that the front-end unit 2210 receives pointers to one or more command streams and manages the one or more streams, reading commands from the streams and forwarding commands to the various units of the PPU 2200.

In an embodiment, the front-end unit 2210 is coupled to a scheduler unit 2212 that configures the various GPCs 2218 to process tasks defined by the one or more streams. In an embodiment, the scheduler unit 2212 is configured to track state information related to the various tasks managed by the scheduler unit 2212 where the state information may indicate which GPC 2218 a task is assigned to, whether the task is active or inactive, a priority level associated with the task, and so forth. In an embodiment, the scheduler unit 2212 manages the execution of a plurality of tasks on the one or more GPCs 2218.

In an embodiment, the scheduler unit 2212 is coupled to a work distribution unit 2214 that is configured to dispatch tasks for execution on the GPCs 2218. In an embodiment, the work distribution unit 2214 tracks a number of scheduled tasks received from the scheduler unit 2212 and the work distribution unit 2214 manages a pending task pool and an active task pool for each of the GPCs 2218. In an embodiment, the pending task pool comprises a number of slots (e.g., 32 slots) that contain tasks assigned to be processed by a particular GPC 2218; the active task pool may comprise a number of slots (e.g., 4 slots) for tasks that are actively being processed by the GPCs 2218 such that as a GPC 2218 completes the execution of a task, that task is evicted from the active task pool for the GPC 2218 and one of the other tasks from the pending task pool is selected and scheduled for execution on the GPC 2218. In an embodiment, if an active task is idle on the GPC 2218, such as while waiting for a data dependency to be resolved, then the active task is evicted from the GPC 2218 and returned to the pending task pool while another task in the pending task pool is selected and scheduled for execution on the GPC 2218.

In an embodiment, the work distribution unit 2214 communicates with the one or more GPCs 2218 via XBar 2220. In an embodiment, the XBar 2220 is an interconnect network that couples many of the units of the PPU 2200 to other units of the PPU 2200 and can be configured to couple the work distribution unit 2214 to a particular GPC 2218. Although not shown explicitly, one or more other units of the PPU 2200 may also be connected to the XBar 2220 via the hub 2216.

The tasks are managed by the scheduler unit 2212 and dispatched to a GPC 2218 by the work distribution unit 2214. The GPC 2218 is configured to process the task and generate results. The results may be consumed by other tasks within the GPC 2218, routed to a different GPC 2218 via the XBar 2220, or stored in the memory 2204. The results can be written to the memory 2204 via the partition units 2222, which implement a memory interface for reading and writing data to/from the memory 2204. The results can be transmitted to another PPU or CPU via the high-speed GPU interconnect 2208. In an embodiment, the PPU 2200 includes a number U of partition units 2222 that is equal to the number of separate and distinct memory devices 2204 coupled to the PPU 2200. A partition unit 2222 will be described in more detail below.

In an embodiment, a host processor executes a driver kernel that implements an application programming interface ("API") that enables one or more applications executing on the host processor to schedule operations for execution on the PPU 2200. In an embodiment, multiple compute applications are simultaneously executed by the PPU 2200 and the PPU 2200 provides isolation, quality of service ("QoS"), and independent address spaces for the multiple compute applications. In an embodiment, an application generates instructions (e.g., in the form of API calls) that cause the driver kernel to generate one or more tasks for execution by the PPU 2200, and the driver kernel outputs tasks to one or more streams being processed by the PPU 2200. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment below.

Figure 23:
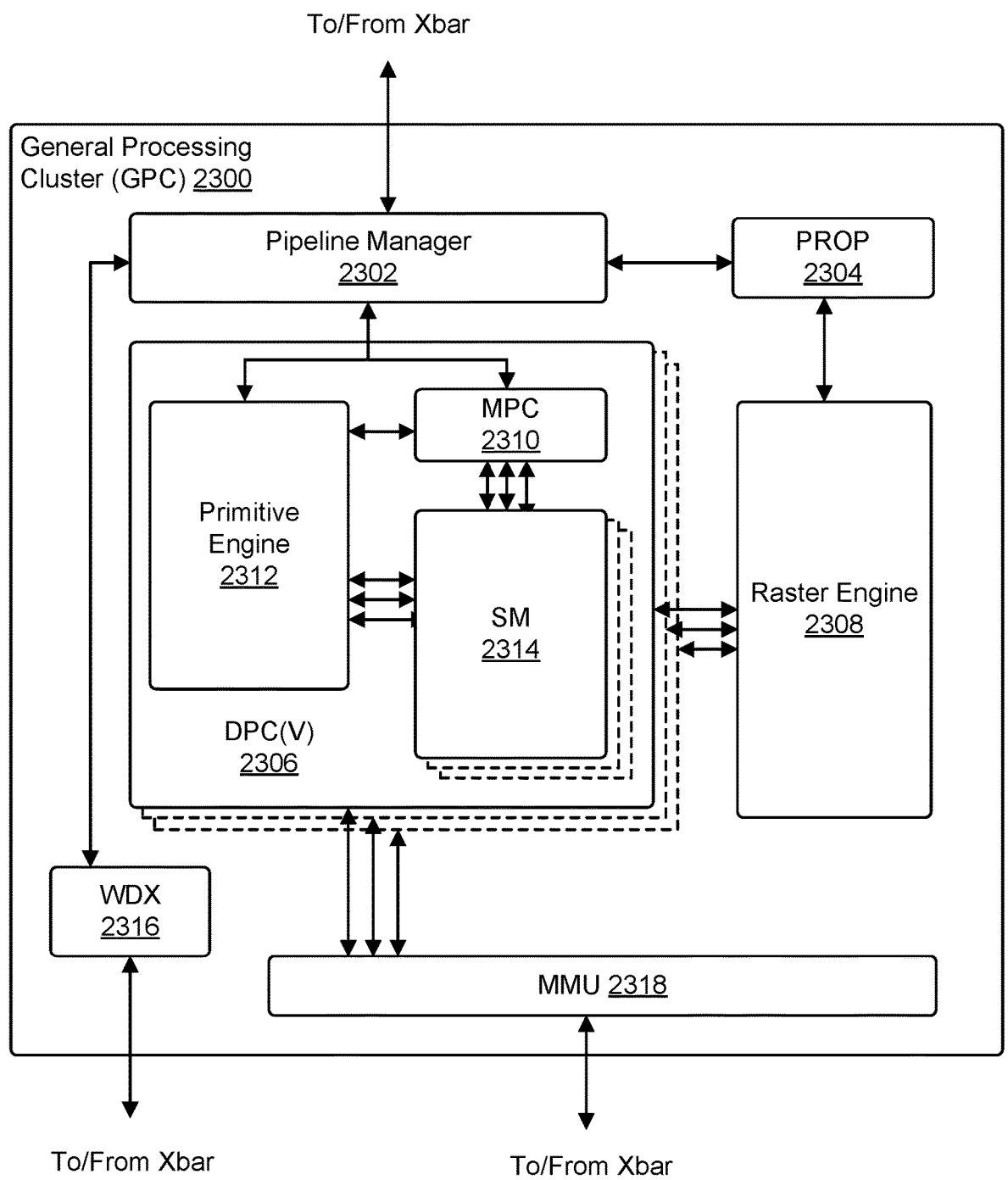
FIG. 23 illustrates an example of a general processing cluster ("GPC"), in accordance with one embodiment.

FIG. 23 illustrates a GPC 2300 such as the GPC illustrated of the PPU 2200 of FIG. 22, in accordance with one embodiment. In an embodiment, each GPC 2300 includes a number of hardware units for processing tasks and each GPC 2300 includes a pipeline manager 2302, a pre-raster operations unit ("PROP") 2304, a raster engine 2308, a work distribution crossbar ("WDX") 2316, a memory management unit ("MMU") 2318, one or more Data Processing Clusters ("DPCs") 2306, and any suitable combination of parts. It will be appreciated that the GPC 2300 of FIG. 23 may include other hardware units in lieu of or in addition to the units shown below.

In an embodiment, the operation of the GPC 2300 is controlled by the pipeline manager 2302. The pipeline manager 2302 manages the configuration of the one or more DPCs 2306 for processing tasks allocated to the GPC 2300. In an embodiment, the pipeline manager 2302 configures at least one of the one or more DPCs 2306 to implement at least a portion of a graphics rendering pipeline. In an embodiment, a DPC 2306 is configured to execute a vertex shader program on the programmable streaming multiprocessor ("SM") 2314. The pipeline manager 2302 is configured to route packets received from a work distribution to the appropriate logical units within the GPC 2300, in an embodiment, and some packets may be routed to fixed function hardware units in the PROP 2304 and/or raster engine 2308 while other packets may be routed to the DPCs 2306 for processing by the primitive engine 2312 or the SM 2314. In an embodiment, the pipeline manager 2302 configures at least one of the one or more DPCs 2306 to implement a neural network model and/or a computing pipeline.

The PROP unit 2304 is configured, in an embodiment, to route data generated by the raster engine 2308 and the DPCs 2306 to a Raster Operations ("ROP") unit in the memory partition unit, described in more detail above. In an embodiment, the PROP unit 2304 is configured to perform optimizations for color blending, organize pixel data, perform address translations, and more. The raster engine 2308 includes a number of fixed function hardware units configured to perform various raster operations, in an embodiment, and the raster engine 2308 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 2308 comprises fragments to be processed by any suitable entity such as by a fragment shader implemented within a DPC 2306.

In an embodiment, each DPC 2306 included in the GPC 2300 comprises an M-Pipe Controller ("MPC") 2310; a primitive engine 2312; one or more SMs 2314; and any suitable combination thereof. In an embodiment, the MPC 2310 controls the operation of the DPC 2306, routing packets received from the pipeline manager 2302 to the appropriate units in the DPC 2306. In an embodiment, packets associated with a vertex are routed to the primitive engine 2312, which is configured to fetch vertex attributes associated with the vertex from memory; in contrast, packets associated with a shader program may be transmitted to the SM 2314.

In an embodiment, the SM 2314 comprises a programmable streaming processor that is configured to process tasks represented by a number of threads. In an embodiment, the SM 2314 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 2314 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread, and threads executing the same instructions may be converged and executed in parallel for better efficiency. In an embodiment, the SM 2314 is described in more detail below.

In an embodiment, the MMU 2318 provides an interface between the GPC 2300 and the memory partition unit and the MMU 2318 provides translation of virtual addresses into physical addresses, memory protection, and arbitration of memory requests. In an embodiment, the MMU 2318 provides one or more translation lookaside buffers ("TLBs") for performing translation of virtual addresses into physical addresses in memory.

Figure 24:
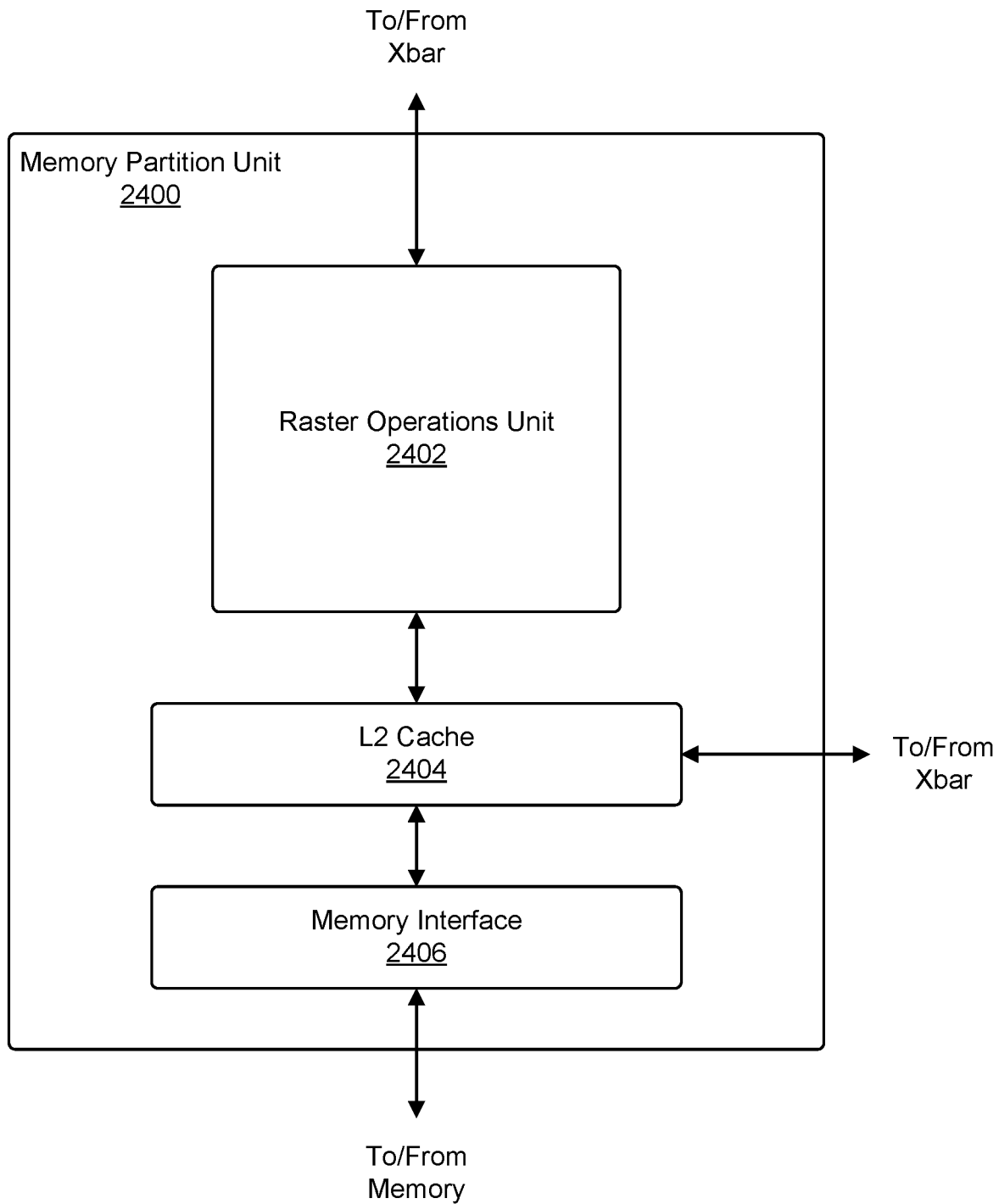
FIG. 24 illustrates an example of a memory partition unit, in accordance with one embodiment.

FIG. 24 illustrates a memory partition unit of a PPU, in accordance with one embodiment. In an embodiment, the memory partition unit 2400 includes a Raster Operations ("ROP") unit 2402; a level two ("L2") cache 2404; a memory interface 2406; and any suitable combination thereof. The memory interface 2406 is coupled to the memory. Memory interface 2406 may implement 32, 64, 128, 1024-bit data buses, or the like, for high-speed data transfer. In an embodiment, the PPU incorporates U memory interfaces 2406, one memory interface 2406 per pair of partition units 2400, where each pair of partition units 2400 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 2406 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 2400 supports a unified memory to provide a single unified virtual address space for CPU and PPU memory, enabling data sharing between virtual memory systems. In an embodiment the frequency of accesses by a PPU to memory located on other processors is traced to ensure that memory pages are moved to the physical memory of the PPU that is accessing the pages more frequently. In an embodiment, the high-speed GPU interconnect 2618 supports address translation services allowing the PPU to directly access a CPU's page tables and provides full access to CPU memory by the PPU.

In an embodiment, copy engines transfer data between multiple PPUs or between PPUs and CPUs. In an embodiment, the copy engines can generate page faults for addresses that are not mapped into the page tables, and the memory partition unit 2400 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regards as to whether the memory pages are resident, and the copy process is transparent.

Data from the memory above or other system memory is fetched by the memory partition unit 2400 and stored in the L2 cache 2404, which is located on-chip and is shared between the various GPCs, in accordance with one embodiment. Each memory partition unit 2400, in an embodiment, includes at least a portion of the L2 cache 2404 associated with a corresponding memory device. In an embodiment, lower level caches are implemented in various units within the GPCs. In an embodiment, each of the SMs may implement a level one ("L1") cache wherein the L1 cache is private memory that is dedicated to a particular SM and data from the L2 cache 2404 is fetched and stored in each of the L1 caches for processing in the functional units of the SMs. In an embodiment, the L2 cache 2404 is coupled to the memory interface 2406 and the XBar.

The ROP unit 2402 performs graphics raster operations related to pixel color, such as color compression, pixel blending, and more, in an embodiment. The ROP unit 2402, in an embodiment, implements depth testing in conjunction with the raster engine 2408, receiving a depth for a sample location associated with a pixel fragment from the culling engine of the raster engine. In an embodiment, the depth is tested against a corresponding depth in a depth buffer for a sample location associated with the fragment. In an embodiment, if the fragment passes the depth test for the sample location, then the ROP unit 2402 updates the depth buffer and transmits a result of the depth test to the raster engine. It will be appreciated that the number of partition units 2400 may be different than the number of GPCs and, therefore, each ROP unit 2402 can, in an embodiment, be coupled to each of the GPCs. In an embodiment, the ROP unit 2402 tracks packets received from the different GPCs and determines which result generated by the ROP unit 2402 is routed to through the Xbar.

Figure 25:
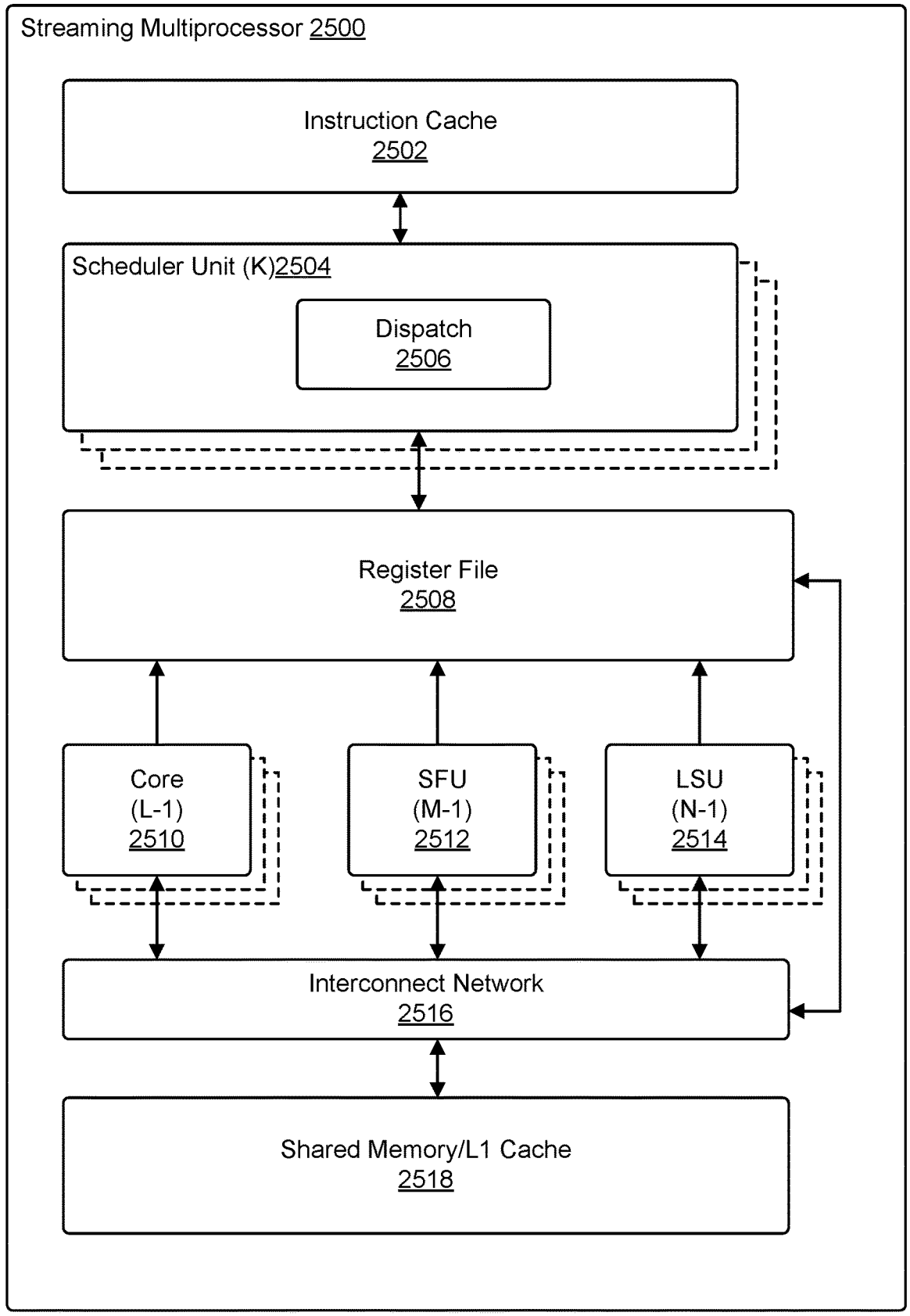
FIG. 25 illustrates an example of a streaming multiprocessor, in accordance with one embodiment.

FIG. 25 illustrates a streaming multi-processor such as the streaming multi-processor above, in accordance with one embodiment. In an embodiment, the SM 2500 includes: an instruction cache 2502; one or more scheduler units 2504; a register file 2508; one or more processing cores 2510; one or more special function units ("SFUs") 2512; one or more load/store units ("LSUs") 2514; an interconnect network 2516; a shared memory/L1 cache 2518; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 2500. In an embodiment, the scheduler unit 2504 receives the tasks from the work distribution unit and manages instruction scheduling for one or more thread blocks assigned to the SM 2500. In an embodiment, the scheduler unit 2504 schedules thread blocks for execution as warps of parallel threads, wherein each thread block is allocated at least one warp. In an embodiment, each warp executes threads. In an embodiment, the scheduler unit 2504 manages a plurality of different thread blocks, allocating the warps to the different thread blocks and then dispatching instructions from the plurality of different cooperative groups to the various functional units (e.g., cores 2510, SFUs 2512, and LSUs 2514) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization among thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enable programmers to define groups of threads explicitly at sub-block (i.e., as small as a single thread) and multi-block granularities, and to perform collective operations such as synchronization on the threads in a cooperative group. The programming model supports clean composition across software boundaries so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 2506 is configured to transmit instructions to one or more of the functional units, and the scheduler unit 2504 includes two dispatch units 2506 that enable two different instructions from the same warp to be dispatched during each clock cycle. In an embodiment, each scheduler unit 2504 includes a single dispatch unit 2506 or additional dispatch units 2506.

Each SM 2500, in an embodiment, includes a register file 2508 that provides a set of registers for the functional units of the SM 2500. In an embodiment, the register file 2508 is divided between each of the functional units such that each functional unit is allocated a dedicated portion of the register file 2508. In an embodiment, the register file 2508 is divided between the different warps being executed by the SM 2500 and the register file 2508 provides temporary storage for operands connected to the data paths of the functional units. In an embodiment, each SM 2500 comprises a plurality of L processing cores 2510. In an embodiment, the SM 2500 includes a large number (e.g., 128 or more) of distinct processing cores 2510. Each core 2510, in an embodiment, includes a fully pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 2510 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 2510. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation D=A× B+C, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 2500 comprises M SFUs 2512 that perform special functions (e.g., attribute evaluation, reciprocal square root, and the like). In an embodiment, the SFUs 2512 include a tree traversal unit configured to traverse a hierarchical tree data structure. In an embodiment, the SFUs 2512 include a texture unit configured to perform texture map filtering operations. In an embodiment, the texture units are configured to load texture maps (e.g., a 2D array of texels) from the memory and sample the texture maps to produce sampled texture values for use in shader programs executed by the SM 2500. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 2500 includes two texture units.

Each SM 2500 comprises N LSUs that implement load and store operations between the shared memory/L1 cache and the register file 2508, in an embodiment. Each SM 2500 includes an interconnect network 2516 that connects each of the functional units to the register file 2508 and the LSU 2514 to the register file 2508, shared memory/L1 cache 2518 in an embodiment. In an embodiment, the interconnect network 2516 is a crossbar that can be configured to connect any of the functional units to any of the registers in the register file 2508 and connect the LSUs 2514 to the register file and memory locations in shared memory/L1 cache 2518.

The shared memory/L1 cache 2518 is an array of on-chip memory that allows for data storage and communication between the SM 2500 and the primitive engine and between threads in the SM 2500 in an embodiment. In an embodiment, the shared memory/L1 cache 2518 comprises 128 KB of storage capacity and is in the path from the SM 2500 to the partition unit. The shared memory/L1 cache 2518, in an embodiment, is used to cache reads and writes. One or more of the shared memory/L1 cache 2518, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 2518 enables the shared memory/L1 cache 2518 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 2500 to execute the program and perform calculations, shared memory/L1 cache 2518 to communicate between threads, and the LSU 2514 to read and write global memory through the shared memory/L1 cache 2518 and the memory partition unit, in accordance with one embodiment. In an embodiment, when configured for general purpose parallel computation, the SM 2500 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a handheld electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrated graphics processing unit ("iGPU") included in the chipset of the motherboard.

Figure 26:
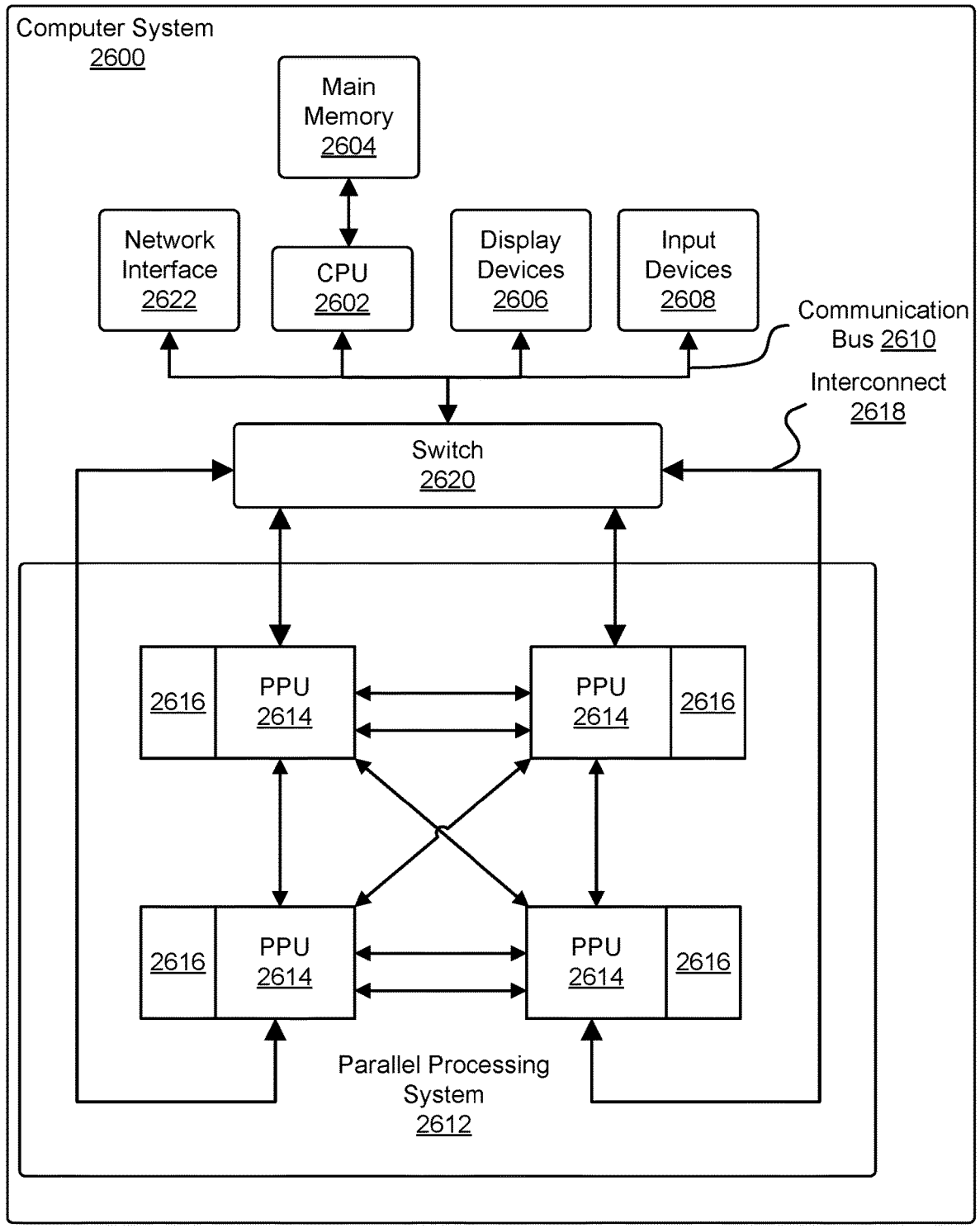
FIG. 26 illustrates a computer system in which the various examples can be implemented, in accordance with one embodiment.

FIG. 26 illustrates a computer system 2600 in which the various architecture and/or functionality can be implemented, in accordance with one embodiment. The computer system 2600, in an embodiment, is configured to implement various processes and methods described throughout this disclosure.

In an embodiment, the computer system 2600 comprises at least one central processing unit 2602 that is connected to a communication bus 2610 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 2600 includes a main memory 2604 and control logic (e.g., implemented as hardware, software, or a combination thereof) and data are stored in the main memory 2604 which may take the form of random access memory ("RAM"). In an embodiment, a network interface subsystem 2622 provides an interface to other computing devices and networks for receiving data from and transmitting data to other systems from the computer system 2600.

The computer system 2600, in an embodiment, includes input devices 2608, the parallel processing system 2612, and display devices 2606 which can be implemented using a conventional CRT (cathode ray tube), LCD (liquid crystal display), LED (light emitting diode), plasma display, or other suitable display technologies. In an embodiment, user input is received from input devices 2608 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 2604 and/or secondary storage. Computer programs, if executed by one or more processors, enable the computer system 2600 to perform various functions in accordance with one embodiment. The memory 2604, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 2602; parallel processing system 2612; an integrated circuit capable of at least a portion of the capabilities of both the central processor 2602; the parallel processing system 2612; a chipset (e.g., a group of integrated circuits designed to work and sold as a unit for performing related functions, etc.); and any suitable combination of integrated circuit.

In an embodiment, the architecture and/or functionality of the various previous figures is implemented in the context of a general computer system, a circuit board system, a game console system dedicated for entertainment purposes, an application-specific system, and more. In an embodiment, the computer system 2600 may take the form of a desktop computer, a laptop computer, a tablet computer, servers, supercomputers, a smart-phone (e.g., a wireless, hand-held device), personal digital assistant ("PDA"), a digital camera, a vehicle, a head-mounted display, a hand-held electronic device, a mobile phone device, a television, workstation, game consoles, embedded system, and/or any other type of logic.

In an embodiment, a parallel processing system 2612 includes a plurality of PPUs 2614 and associated memories 2616. In an embodiment, the PPUs are connected to a host processor or other peripheral devices via an interconnect 2618 and a switch 2620 or multiplexer. In an embodiment, the parallel processing system 2612 distributes computational tasks across the PPUs 2614 which can be parallelizable—for example, as part of the distribution of computational tasks across multiple GPU thread blocks. In an embodiment, memory is shared and accessible (e.g., for read and/or write access) across some or all of the PPUs 2614, although such shared memory may incur performance penalties relative to the use of local memory and registers resident to a PPU. In an embodiment, the operation of the PPUs 2614 is synchronized through the use of a command such as _syncthreads( ) which requires all threads in a block (e.g., executed across multiple PPUs 2614) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A modular augmented reality display, comprising:
a set of prescription eyewear that includes a lens to be attached to a frame;
an electronic display removably attached to the prescription eyewear, the electronic display capable of producing a first image;

a beam-shaping lens;
a coupling prism that in combination with the beam-shaping lens directs the first image into the lens so that the first image is internally reflected within the lens; and
an image combiner within the lens that is positioned to reflect the first image to a wearer, and combine the first image with a second image transmitted through the lens and the image combiner.

2. The modular augmented reality display of claim 1, further comprising a support pack connected to the prescription eyewear, the support pack including a battery that supplies power to the electronic display.

3. The modular augmented reality display of claim 2, wherein the support pack includes a microcomputer and a first wireless interface.

4. The modular augmented reality display of claim 2, wherein data is transmitted from the support pack to the electronic display.

5. The modular augmented reality display of claim 4, wherein serial data and DC power are provided to the electronic display on a single conductor.

6. The modular augmented reality display of claim 4, wherein data is exchanged between the support pack and the electronic display via a second wireless interface.

7. The modular augmented reality display of claim 1, wherein the first image is directed by the beam shaping lens from the electronic display into the coupling prism mounted on the lens.

8. The modular augmented reality display of claim 1, wherein the electronic display is coupled to a linear servo mechanism that moves the electronic display to change the focal distance of the first image.

9. The modular augmented reality display of claim 1, wherein the electronic display is an organic light-emitting diode display or a backlit light valve technology film.

10. The modular augmented reality display of claim 1, wherein the electronic display is magnetically attached to the prescription eyewear.

11. The modular augmented reality display of claim 1, wherein the removable attachment includes a mechanical alignment guide that aids in positioning the electronic display on the prescription eyewear.

12. The modular augmented reality display of claim 1, further comprising a removable control unit connected to the prescription eyewear having a connection to the electronic display, the removable control unit including a battery that supplies power to the electronic display.

13. The modular augmented reality display of claim 2, wherein the support pack includes a flexible connection to the electronic display that allows weight of the support pack to be substantially unsupported by the prescription eyewear.

14. An augmented reality display, comprising:
a set of eyeglasses that include a lens attached to a frame;
an electronic display attached to the eyeglasses, the electronic display capable of producing a first image;
a beam-shaping lens;
a coupling prism that in combination with the beam-shaping lens directs the first image into the lens so that the first image is internally reflected within the lens;
an image combiner within the lens that is positioned to reflect the first image to a wearer, and combine the first image with a second image transmitted through the lens and the image combiner; and
a belt pack that includes a battery and a microcomputer that provides display data to the electronic display.

15. The augmented reality display of claim 14, further comprising a mechanical attachment that allows the electronic display to be repeatedly detached from the eyeglasses.

16. The augmented reality display of claim 15, wherein the mechanical attachment is a magnetic attachment with indexing features that align the electronic display with the lens.

17. The augmented reality display of claim 14, wherein:
the lens is adapted to an eyeglass prescription of the wearer; and
a surface of the image combiner is adapted to the eyeglass prescription of the wearer.

\* \* \* \* \*